United States Patent [19]
Fujii et al.

[11] Patent Number: 5,914,763
[45] Date of Patent: Jun. 22, 1999

[54] LIQUID CRYSTAL DISPLAY WITH SUBSTANTIALLY EQUAL RESISTANCES FOR SETS OF TERMINAL ELECTRODES AND INCLINED WIRING ELECTRODES

[75] Inventors: Tatsuhisa Fujii; Mitsugu Katayama, both of Mobara; Tomohide Ohira, Yokohama; Tatsuyuki Fumikura; Hitomi Madokoro, both of Mobara, all of Japan

[73] Assignees: Hitachi, Ltd., Tokyo; Hitachi Device Engineering Co., Ltd., Mobara, both of Japan

[21] Appl. No.: 09/056,780

[22] Filed: Apr. 8, 1998

Related U.S. Application Data

[63] Continuation of application No. 08/523,842, Sep. 7, 1995, Pat. No. 5,757,450.

[30] Foreign Application Priority Data

Sep. 8, 1994 [JP] Japan .................................. 6-214785
Sep. 8, 1994 [JP] Japan .................................. 6-214825
Sep. 12, 1994 [JP] Japan .................................. 6-216857

[51] Int. Cl.$^6$ ...................... G02F 1/1345; G02F 1/1343
[52] U.S. Cl. .......................... 349/149; 349/143; 349/150; 349/152
[58] Field of Search .................................. 349/143, 152, 349/150, 149

[56] References Cited

U.S. PATENT DOCUMENTS

| | | | |
|---|---|---|---|
| 4,515,647 | 5/1985 | Sasaki et al. ........................... | 349/152 |
| 5,402,255 | 3/1995 | Nakanishi et al. ...................... | 349/150 |
| 5,555,116 | 9/1996 | Ishikawa et al. ....................... | 349/143 |
| 5,572,346 | 11/1996 | Sakamoto et al. ..................... | 349/150 |
| 5,668,700 | 9/1997 | Tagusa et al. .......................... | 349/150 |
| 5,680,191 | 10/1997 | Voisin et al. ............................ | 349/150 |
| 5,734,458 | 3/1998 | Ikubo et al. ............................. | 349/152 |
| 5,737,053 | 4/1998 | Yomogihara et al. .................. | 349/150 |
| 5,742,074 | 4/1998 | Takizawa et al. ...................... | 349/152 |
| 5,906,071 | 3/1990 | Takahara et al. ...................... | 349/152 |

*Primary Examiner*—William L. Sikes
*Assistant Examiner*—Tarifur R. Chowdhury
*Attorney, Agent, or Firm*—Antonelli, Terry, Stout & Kraus, LLP

[57] ABSTRACT

A liquid crystal display including a plurality of parallel display electrodes wired over an electrode substrate, terminals for the display electrodes led out to the end portion of the electrode substrate and connected to TCPs, the terminals having pitches smaller than those of the display electrodes, and leadout wirings for connecting the display electrodes and the terminals. The leadout wirings each consist of a portion extending from a respective display electrode as it is, a portion extended from the respective terminals as it is, and almost parallel, inclined linear wiring that connects the two extended portions. The length of the two extended portions and the width of the inclined linear wiring are adjusted so that the wiring resistances of the individual leadout wirings are substantially equal.

24 Claims, 27 Drawing Sheets

LIQUID CRYSTAL DISPLAY WITH SUBSTANTIALLY EQUAL RESISTANCES FOR SETS OF TERMINAL ELECTRODES AND INCLINED WIRING ELECTRODES

CROSS REFERENCE TO RELATED APPLICATION

This is a continuation of U.S. application Ser. No. 08/523,842 filed Sep. 7, 1995, now U.S. Pat. No. 5,757,450, the subject matter of which is incorporated by reference herein.

BACKGROUND OF THE INVENTION

1. Field of the Invention

The present invention relates to a liquid crystal display of a simple matrix type or an active matrix type and more particularly to a liquid crystal display suitable for high-quality display by optimizing the geometry of transparent electrodes formed on the liquid crystal display element substrate.

2. Description of the Prior Art

The liquid crystal display comprises, for example, a liquid crystal display unit (hereinafter simply referred to as an LCD), a backlight disposed under the liquid crystal display unit to supply light to the liquid crystal display unit, a drive circuit for the liquid crystal display unit arranged outside the outer periphery of the liquid crystal display unit, a molded frame body holding these members, and a metal frame which accommodates these members and has a liquid crystal display window. The liquid crystal display unit includes two insulating substrates made of transparent glasses (called electrode substrates) which are placed as to be opposite to each other with a predetermined distance in between in such a way that the surfaces of the insulating substrates on which transparent pixel electrodes for display and a molecular alignment layer are so stacked as to face each other; a sealing material provided between the insulating substrates and along the circumferential portion of the insulating substrates for joining these insulating substrates together; liquid crystal fed and sealed inside the sealing member between the insulating substrates through a liquid crystal injection port provided at one part of the sealing member; and polarizing plates provided outside the insulating substrates.

The liquid crystal display unit and the drive circuit board are electrically connected by a tap carrier package (TCP) where a semiconductor integrated circuit chip for driving the liquid crystal display unit is mounted.

More specifically, a large number of output terminals of the circuit board and a large number of input terminals (outer leads on the input side) of the TCP are connected by soldering. A large number of output terminals (outer leads on the output side) of the TCP and a large number of input terminals of the liquid crystal display unit connected to the display electrodes (the input terminals are formed and arranged at the end portion of the surface of one of the transparent glass substrates or electrode substrates constituting the liquid crystal display unit) are connected by an anisotropic conductive film. A large number of input terminals of the semiconductor integrated circuit chip mounted on the TCP are connected to a large number of inner leads on the output side of the TCP, and a large number of output terminals of the semiconductor integrated circuit chip are connected to a large number of inner leads on the input side of the TCP.

In a simple matrix liquid crystal display unit, transparent electrodes are parallely formed on the facing surfaces of the two substrates, respectively. When viewed from a direction perpendicular to both substrates surfaces, the parallel transparent electrodes on the two substrates cross (actually, they do not cross), and intersections form pixels, i.e., effective display areas.

Among literatures describing such a liquid crystal display are Japanese Patent Laid-Open No. 214548/1986 and Japanese Utility Model Laid-Open No. 13765/1990.

FIGS. 29A and 29B are schematic plan views showing conventional transparent electrode wiring on the upper and lower electrode substrates.

Of the two electrode substrates constituting a liquid crystal display unit, the lower electrode substrate (also called a data electrode substrate or segment electrode substrate) 312 has on its surface parallel lower electrodes (also called data drive element electrodes or segment electrodes) 332, and the upper electrode substrate (also called a scanning electrode substrate or common electrode substrate) 311 has on its surface parallel upper electrodes (also called scanning drive element electrodes or common electrodes) 331.

These two upper and lower electrode substrates 311, 312 are superposed and assembled into a simple matrix liquid crystal display unit (see FIG. 20). The parallel upper electrodes 331 and parallel lower electrodes 332 formed on the facing surfaces of the two substrates are arranged perpendicularly to each other (they cross without contacting each other) when the completed liquid crystal display unit is seen in a direction perpendicular to the surfaces of these substrates. Each cross point constitutes one pixel, that is, each cross point region forms an effective display region.

SUMMARY OF THE INVENTION

FIG. 28 is a schematic plan view showing an essential portion of wiring formed on the electrode substrate that constitutes a conventional liquid crystal display unit, i.e., display electrodes, TCP electrode connection terminals and readout wirings connecting the display electrodes and the TCP electrode connection terminals.

Numeral 311 (this is true of 312, but 311 is used for simplicity throughout the explanation) denotes one of electrode substrates formed of transparent glasses that constitute a liquid crystal display unit (not shown; see FIG. 20). Reference symbols 40-1 to 40-8 denote display electrodes that constitute pixels and which are formed on the surface of the electrode substrate 311, made of a transparent conductive film and arranged parallel to each other. Reference symbols 41-1 to 41-8 represent terminals (connection electrodes or input terminals) connected to TCP electrodes (outer leads on the output side mentioned above), which are drive elements. Reference symbols 42-1 to 42-8 denote inclined linear wirings or terminal leadout wirings that connects the display electrodes 40-n and the terminals 42-n (n is an arbitrary integer). Numeral 43 denotes an aligning mark for TCP used when the TCP is mounted on the electrode substrate 311. Numeral 44 is the center line of a group of terminals corresponding to one TCP mounted on the electrode substrate 311. An area where a sealing material is provided is represented by 36.

In the electrode substrate 311 that makes up the liquid crystal display unit, the pitches of the TCP electrodes are usually narrower than those of the parallelly arranged display electrodes 40-n. That is, the pitches of the terminals 41-n connected to the TCP electrodes are narrower than those of the display electrodes 40-n. The leadout wirings connecting the display electrodes 40-n and the terminals 41-n are inclined linear wirings at 42-n. As shown in FIG.

28, in the conventional leadout wirings, their wiring resistances are made equal by adjusting the angles of the inclined linear wirings 42-n (with respect to the display electrodes 40-n or terminals 41-n) and the widths of the inclined linear wirings 42-n. Such leadout wirings are called radial wirings.

Such a conventional technique involves the following problems.

The area utilization efficiency (wiring efficiency) of the leadout wirings in the electrode substrate 311 is low, making the leadout wirings long, which in turn increases the wiring resistances. To shorten the lengths of the leadout wirings, the widths of the readout wirings must be small to provide clearances between the wirings. This increases the wiring resistances. At present, the resistances of the leadout wirings are in the range of 500Ω to 1 kΩ, which is large compared with the output resistance of a drive semiconductor IC chip of 500–700Ω.

Because the terminals 41-n, arranged in line at the end of the electrode substrate 311 and connected to the TCP terminals (electrodes), are widely spaced and because the thickness of the terminals 41-n consisting of, for example, an ITO (indium-tin-oxide; nesa) film is as large as 0.2–0.3 μm, there are differences in height between portions where the terminals 41-n exist and portions where they do not. Hence, when the liquid crystal display unit is mass-produced, a pattern formed by the height difference is transferred onto a rubbing roller, which performs aligning treatment (rubbing) of the molecular alignment layer formed on the display electrodes 2. If the alignment treatment is performed by using this rubbing roller, rubbing streak variation occurs in the molecular alignment layer, degrading the display quality.

Further, because the inclined linear wirings 42-n, the leadout wirings, are arranged radially, another nonuniformity occurs, that is, the intervals between the inclined linear wirings 42-n become smaller from the display electrodes 40-n toward the terminals 41-n. As a result, on the inner side of the sealing material 36 of the completed liquid crystal display unit (on the side where liquid crystal exists), tonal irregularities occur in the frame edge portion or unlit portion outside the display portion (lit portion) which is uniformly black.

Furthermore, because the display electrodes 40-n in the display section are arranged parallel at equal intervals, the wiring density is uniform. The radially arranged, inclined linear wirings 42-n, on the other hand, has nonuniform wiring density, so that in liquid crystal displays that require high-precision gap (±0.1 μm) between the electrode substrates, particularly in supertwisted nematic (STN) liquid crystal display (LCD), the effective density of the spacers used to set the high-precision gap has a great influence. Therefore, because the conventional, radially arranged, inclined linear wirings 42-n generally have a lower wiring density than the display section, color irregularlity resulting from gap variation at the frame edge portion occurs. The transparent electrodes are formed of thick ITO films with a thickness of about 0.2–0.3 μm. Because the spacers are supported by the display electrodes 2 and inclined linear wirings 42-n, both formed of ITO films, on the upper and lower electrode substrates, the spacers in the area where there are no electrodes become free, making the gap control ineffective.

Literatures covering such a technology include Japanese Patent Laid-Open No. 289626/1991, 70627/1992, 170522/1992, 369622/1992 and 127181/1993.

To reduce luminance irregularlity caused by crosstalk of liquid crystal pulse drive in the STN (Super Twisted Nematic)-LCD, i.e., shadowing, to such an extent that it is no longer seen by the viewer, it is the best method to lower the resistance of the transparent electrode. It is generally said that the sheet resistance of the transparent electrode wiring made of ITO (indium-tin-oxide, i.e., nesa) needs to be lower than about 2 Ω/q, that the output resistance of the drive element be lower than about 100Ω and that the setting accuracy of the bias circuit be lower than about 0.2%. Hence, the demand on the apparent sheet resistance of the liquid crystal display unit is less than about 2 Ω/q, but the present color STN-LCD has an apparent sheet resistance of about 10 Ω/q. The wiring resistance of the scanning electrode in the liquid crystal display unit with, for instance, a 9.4-inch display screen is therefore about 6400Ω from end to end. In order that shadowing cannot be seen by the viewer, the wiring resistance needs to be reduced below about 1280Ω. With the conventional LCD, however, it has been difficult to reduce shadowing.

Literatures describing such technologies include, for example, Japanese Patent Laid-Open No. 239225/1991, 239226/1991 and 51333/1994.

Based on these problems arising in conventional technologies, the objects of the present invention are summarized as follows.

A primary object of this invention is to provide a liquid crystal display with a high display quality.

A more specific first object of this invention is to provide a liquid crystal display, which has a high area utilization efficiency for the leadout wirings and low-resistance leadout wirings.

A second object of this invention is to provide a liquid crystal display, in which no rubbing streaks are formed in the display section.

A third object of this invention is to provide a liquid crystal display, which has no tonal irregularity in the frame edge portion but has a uniform black unlit area.

A fourth object of this invention is to provide a liquid crystal display, which can precisely control the gap between the substrates and produces no color irregularity.

A fifth object of this invention is to provide a liquid crystal display, which can reduce shadowing (uneven brightness) on the screen caused by crosstalk of liquid crystal pulse drive and thereby enhance the display quality.

The foregoing and other objects, advantages, manner of operation and novel features of the present inventions will be understood from the following detailed description when read in connection with the accompanying drawings.

DESCRIPTION OF THE PREFERRED EMBODIMENTS

Figure 1:
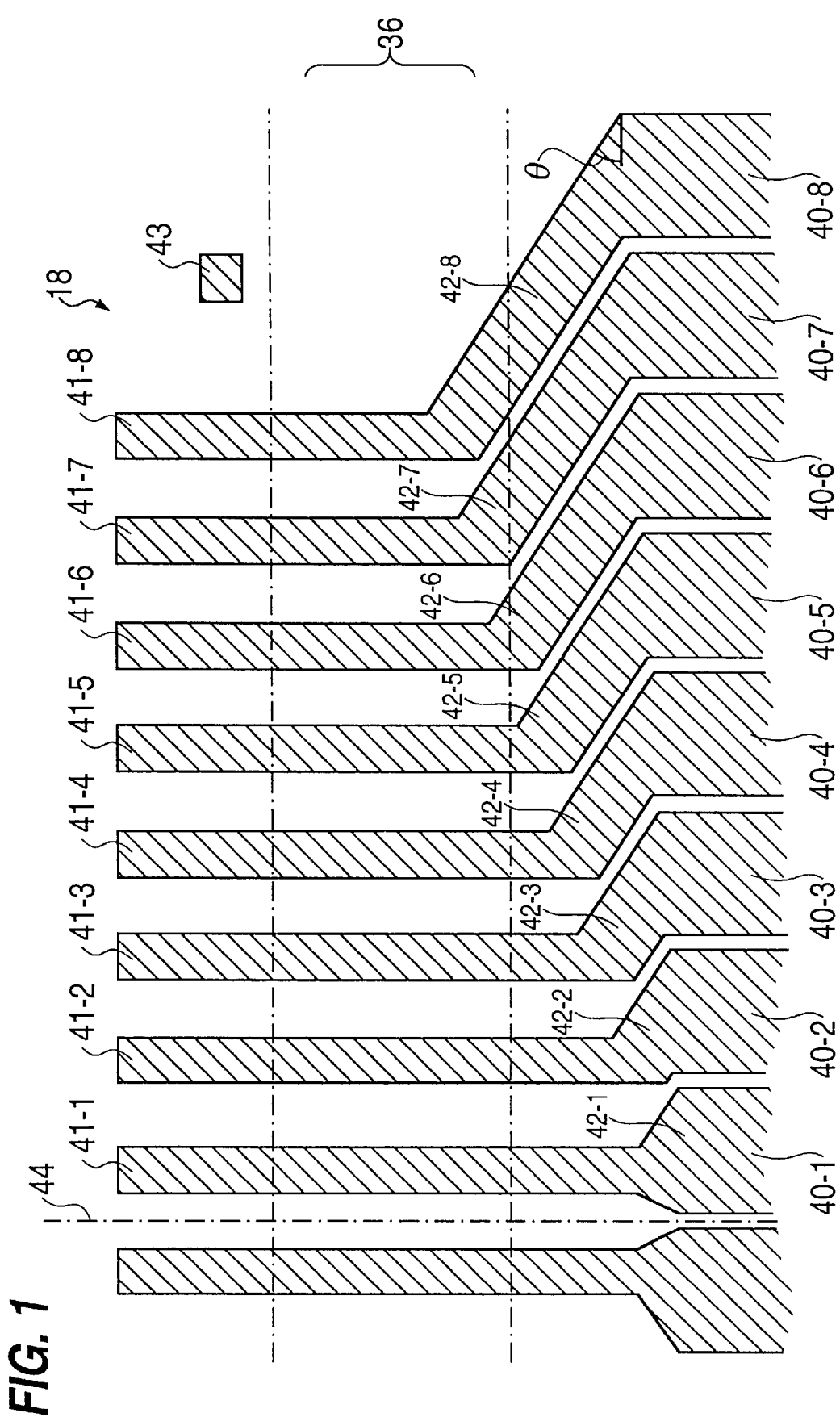
FIG. 1 is a partial plan view of the first embodiment showing leadout wirings on the electrode substrate applied to the liquid crystal display of this invention.

FIG. 1 is a partial plan view of an electrode substrate that constitutes a liquid crystal display unit of the first embodiment of this invention. This schematically shows a part of the leadout wirings on the right-hand side of the center line of the terminal group which corresponds to one TCP mounted on an electrode substrate. The electrode substrate was fabricated according to an optimum algorithm of this invention.

While each TCP (tape carrier package), a drive element, usually has 80–160 electrodes, only eight electrodes are shown in this embodiment for the sake of simplicity. Although the number of electrodes differs, the configuration of the leadout wirings of this invention can be applied as it is.

Figure 7A:
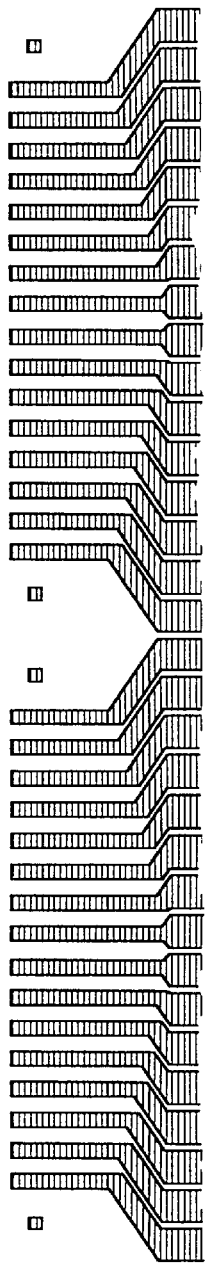
FIG. 7A is a partial plan view showing part of the first embodiment, whose area is about four times larger than that shown in FIG. 1.

FIG. 7A shows a plan view covering an area about four times as large as the area shown in FIG. 1.

Figure 9A:
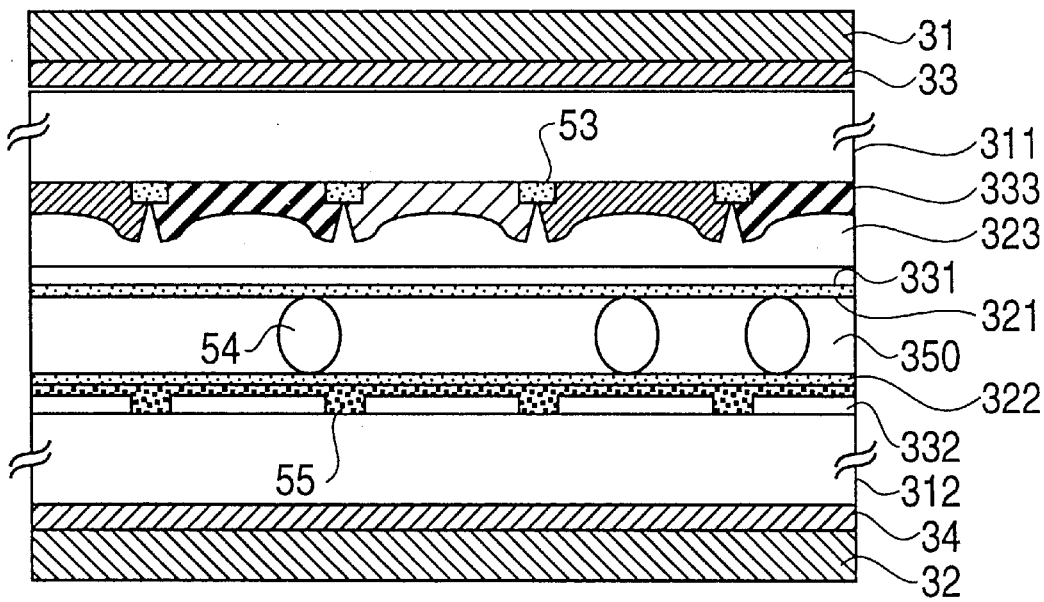
FIG. 9A is an enlarged cross section taken along the line A–A' of FIG. 8
Figure 9B:
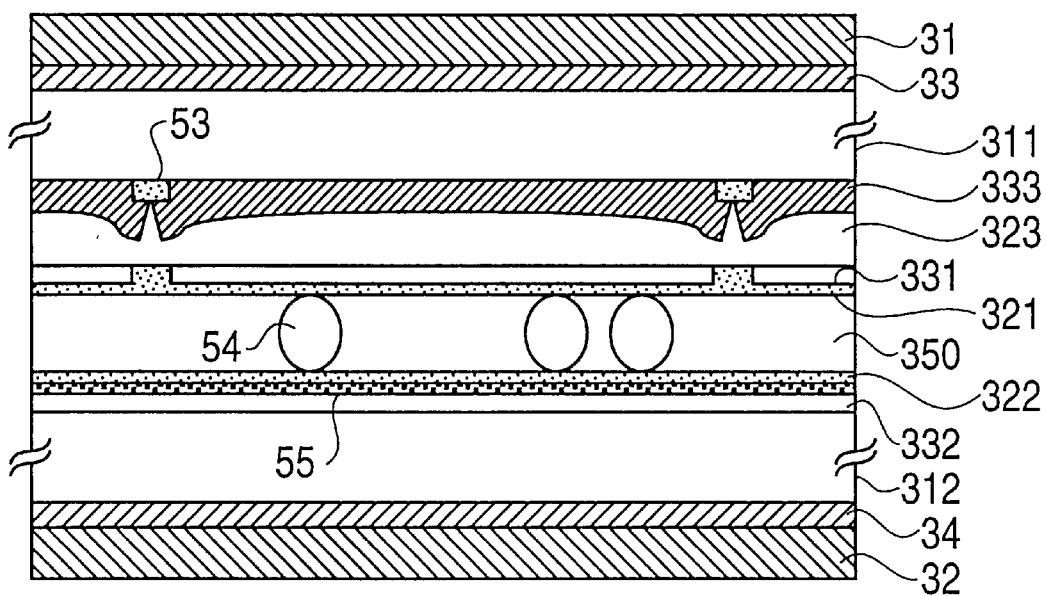
FIG. 9B is an enlarged cross section taken along the line B–B' of FIG. 8.
Figure 18:
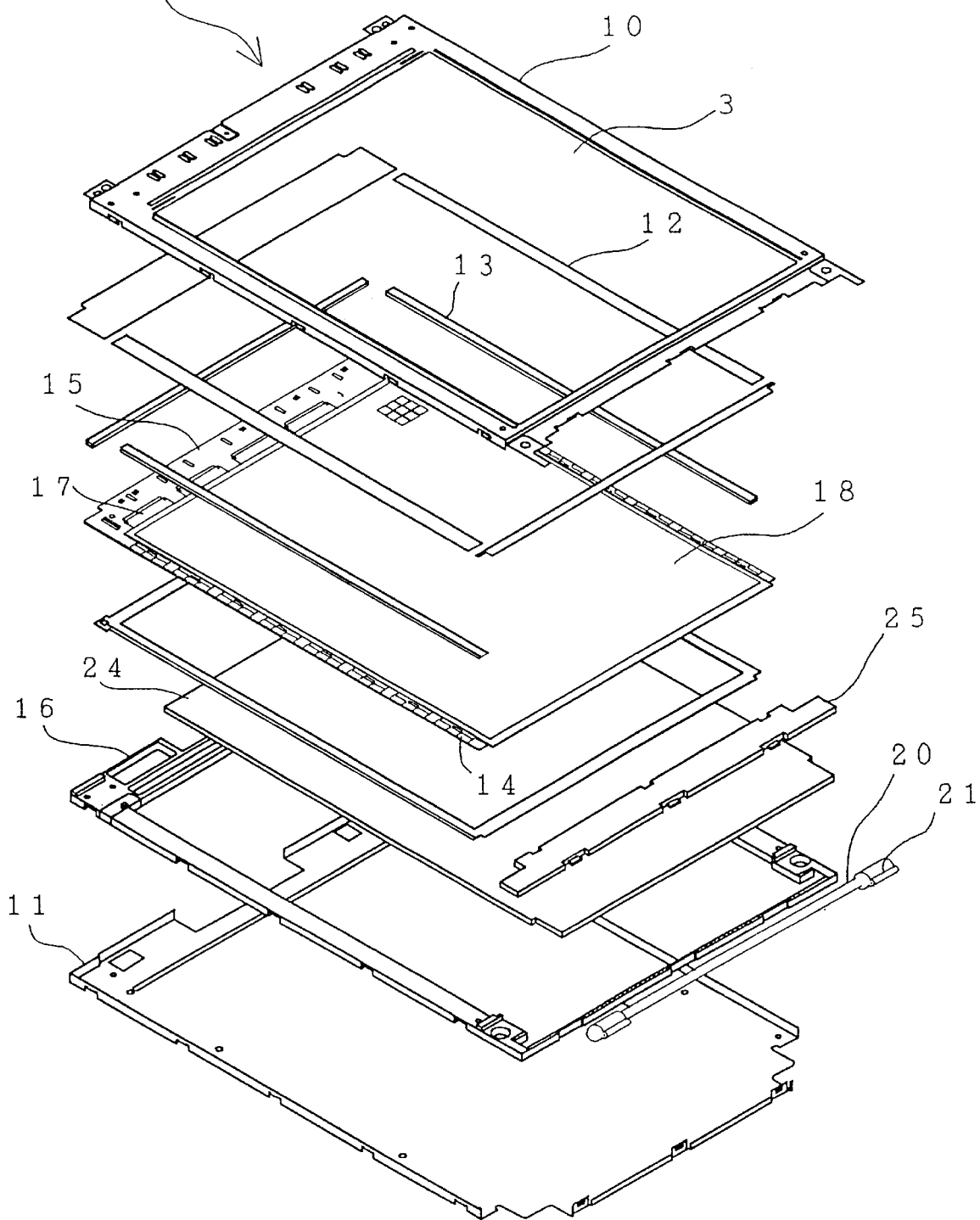
FIG. 18 is an exploded perspective view showing an example of the liquid crystal display to which this invention is applied.
Figure 20:
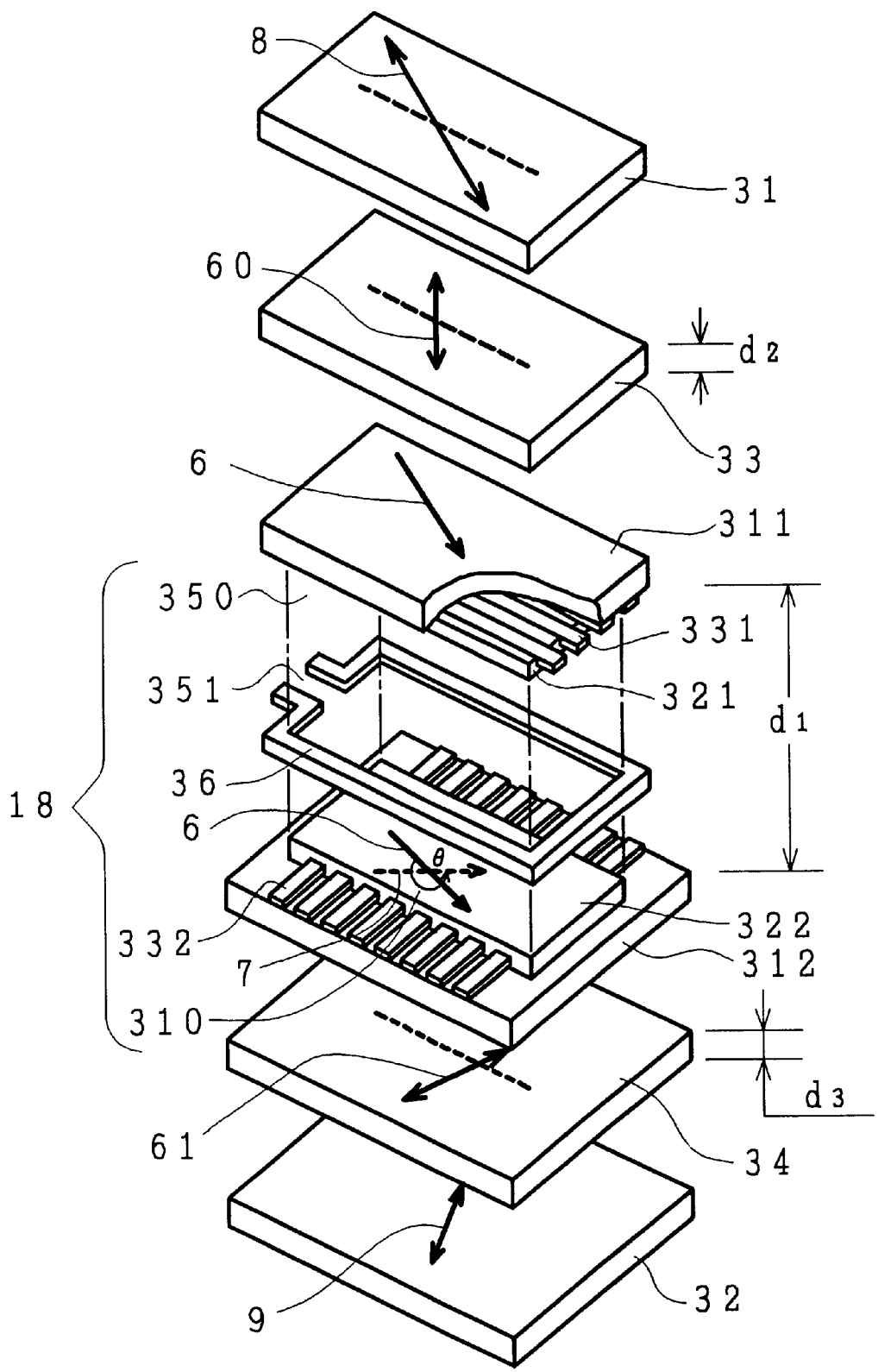
FIG. 20 is an exploded perspective view showing an example of the liquid crystal display unit to which this invention is applied.

Reference number 18 represents one of electrode substrates formed of a transparent glass insulating substrate that constitutes a liquid crystal display unit (not shown here; see FIGS. 18 and 20). Reference symbols 40-1 to 40-8 are display electrodes (In FIGS. 9A and 9B, represented by 331 or 332) that constitute pixels and are formed on the surface of an electrode substrate 311 (or 312), formed of a transparent conductive film and arranged parallel to each other. Reference symbols 41-1 to 41-8 are terminals (connection electrodes, i.e., input terminals) connected to electrodes (outer leads on the output side) of a TCP (not shown here; see reference number 14 or 17 of FIG. 18). Inclined linear wirings 42-1 to 42-8 are a part of the terminal leadout wirings that connect the display electrodes 40-n and the terminals 41-n. An aligning mark 43 is used to align the TCP when the TCP is mounted on the electrode substrate 311. Numeral 44 designates the center line of a group of terminals that corresponds to one TCP mounted on the electrode substrate. Numeral 36 designates a portion where a sealant is provided.

The pitches of the terminals 41-n led out to the end of the electrode substrate and connected to the TCP is narrower than those of the display electrodes 40-n parallelly arranged on the electrode substrate, and thus leadout wirings 42-n need to be provided for connecting these electrodes. The leadout wirings consist of portions extending from the display electrodes 40-n, portions extending from the terminals 41-n, and inclined linear wirings 42-n that connect the two groups of extended portions, have equal angles with respect to the display electrodes 40-n and the terminals 41-n and are parallel to each other. The lengths of the two groups of extended portions and the widths of the inclined linear wirings 42-n are calculated and formed so that the resistances of the leadout wirings are the same.

There are the following four fundamental conditions for wiring.

All the inclined linear wirings 42-n are parallel to each other and tilted at an angle of $\theta$ ($-\theta$ on the left-hand side of the center line 44). They are all symmetrical with respect to the center line 44. The angle $\theta$ is in the range of, say, 25–50°.

The intervals between the inclined linear wirings 42-n are all set according to the wiring rule ($d_{LCD}$) with no margin.

The terminals 41-n have the same width over the full length including the extended portions. The terminals 41-n and the display electrodes 40-n are parallel to each other (perpendicular to the terminal leadout end of the electrode substrate of the liquid crystal display unit). The distances between the terminals 41-n are set according to the TCP bonding rule ($d_{TCP}$).

The display electrodes 40-n have the same width over the full length including the extended portions. The intervals between the display electrodes 40-n are set according to the TCP bonding rule ($d_{LCD}$).

Now, referring to FIG. 2 and FIG. 3, the construction of the readout wirings 42-n will be explained in detail.

The wiring algorithm is as follows.

Figure 2:
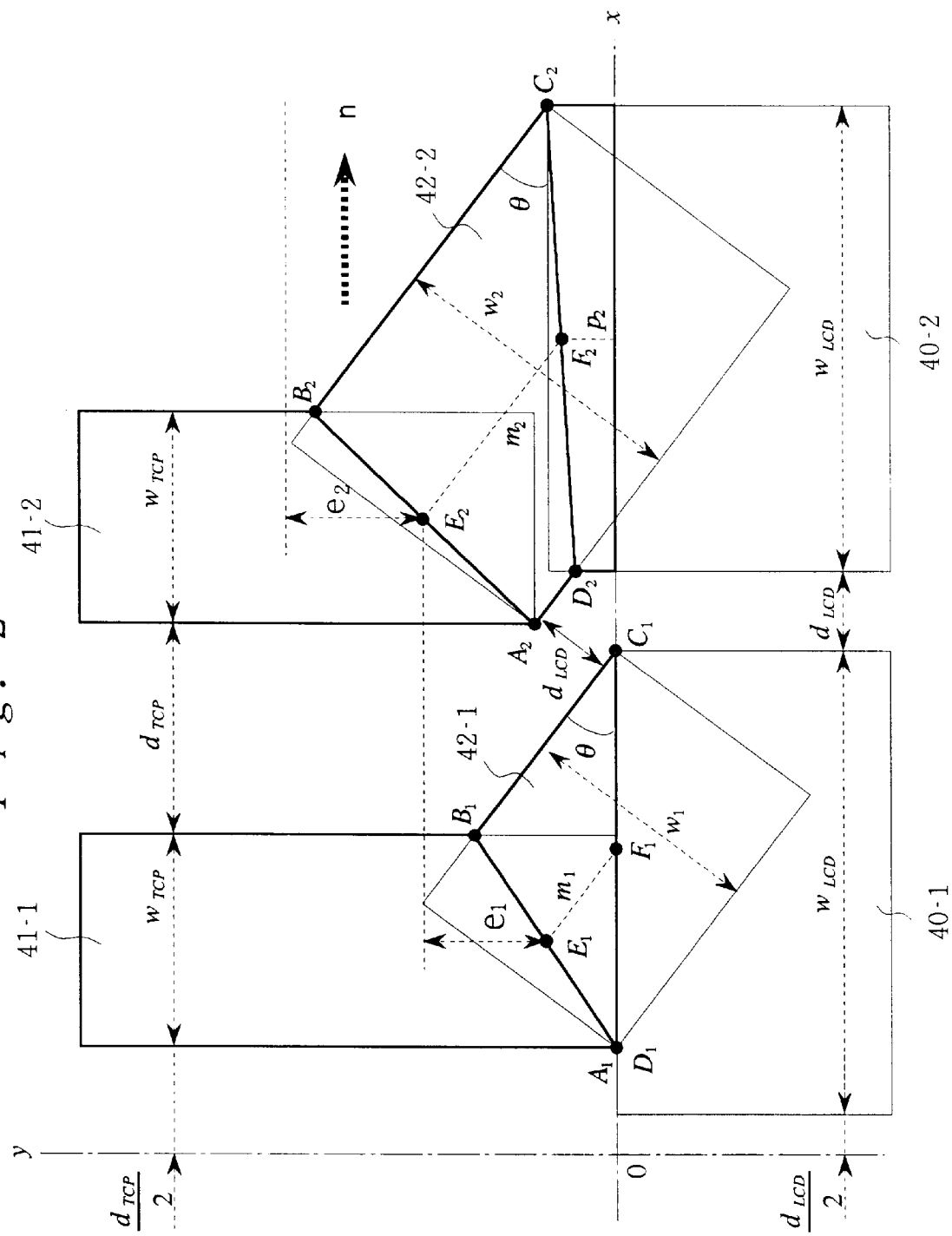
FIG. 2 is a diagram showing the coordinate relationship between a first and a second leadout wiring of the first embodiment.
Figure 3:
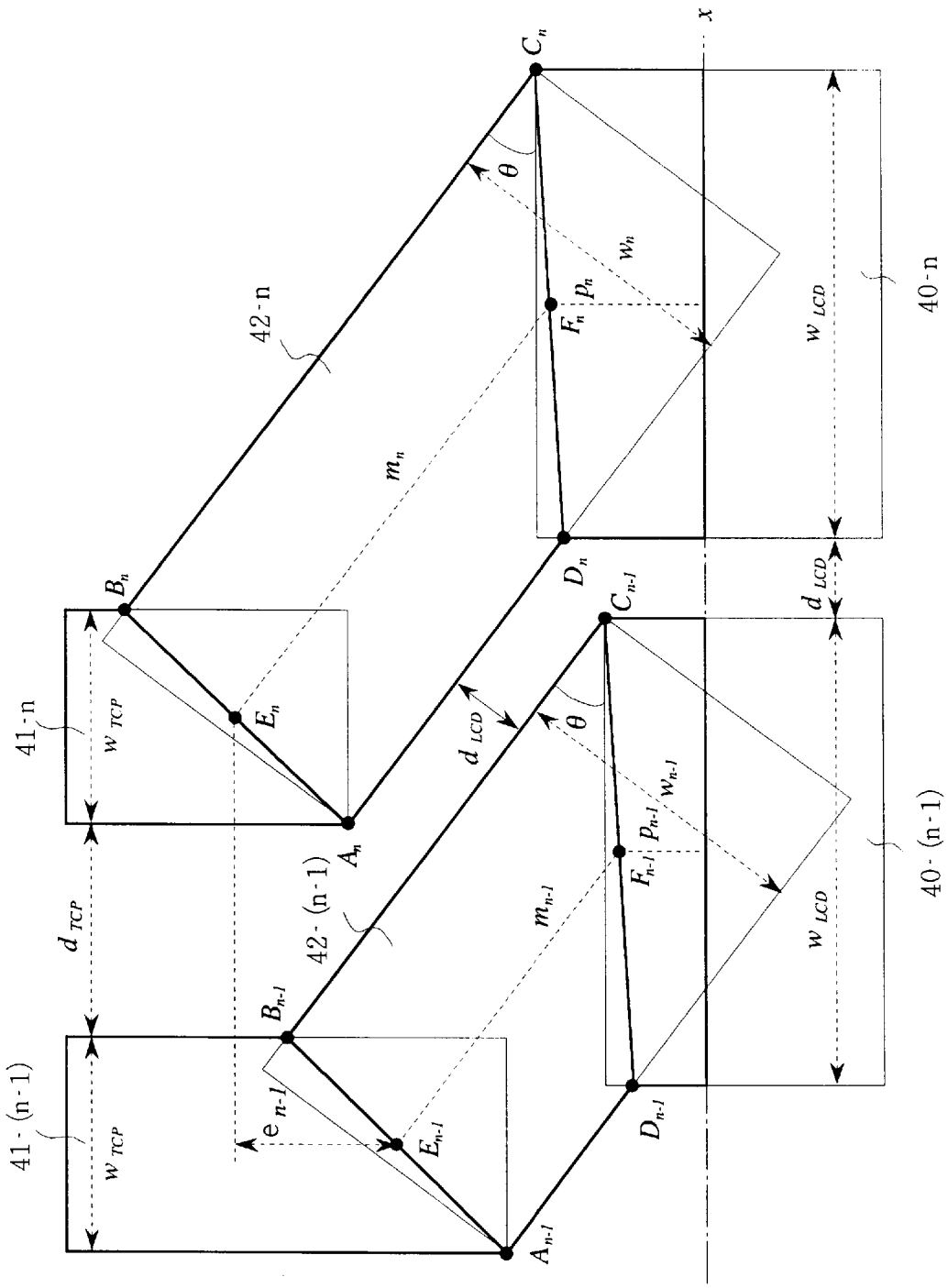
FIG. 3 is a diagram showing the correlation between an (n−1)-th and an n-th leadout wiring of the first embodiment.

(1) The first leadout wiring to the immediate right of the center line 44 connects linearly the display electrode 40-1 and the terminal 41-1 as it is (see FIG. 2).

(2) Draw a line from the end C1 of the display electrode 40-1 at an arbitrary angle $\theta$.

(3) The intersection of the extended line from the C1 at the angle $\theta$ and the extended line of the terminal 41-1 is taken as B1.

(4) A point A2 is determined so that the distance from the extended line of the terminal 41-2 to the line segment B1-C1 is a specified $d_{LCD}$.

(5) Draw a line at the angle $\theta$ from the point A2 (parallel to the line segment B1-C1). The intersection of this line and the extended line of the display electrode 40-2 is taken as D2.

(6) The width w1 of the inclined linear wiring 42-1 is determined arbitrarily.

(7) Draw a line (parallel to the line segment A2-D2) so that the distance between this line and the line segment A2-D2 is w2. The intersection of the drawn line and the extended line of the terminal 41-2 is taken as B2, and the intersection between it and the extended line of the display electrode 40-2 is taken as C2.

(8) Let the middle point of line segment A1-B1 be E1, the middle point of line segment D1-C1 be F1, the middle point of line segment A2-B2 be E2, the middle point of line segment D2-C2 be F2, the distance between E1 and E2 on y axis be e1, the length of line segment E1-F1 be m1, the length of line segment E2-F2 be m2, and the y-axis component of F2 be P2.

(9) Determine the width w2 of the inclined linear wirings 42-2 of the leadout wirings so that the following calculation formula holds. That is, w2 is determined to satisfy the condition that the resistances of the first and second leadout wirings are the same.

$$\left(\frac{e_1}{w_{TCP}} + \frac{m_1}{w_1}\right)R_{sq} = \left(\frac{m_2}{w_2} + \frac{p_2}{w_{LCD}}\right)R_{sq}$$

where $W_{TCP}$ represents the width of the terminal 41-n determined according to the width of the TCP electrode, $W_{LCD}$ represents the width of the display electrode 40-n, and $R_{sq}$ represents the sheet resistance ($\Omega/q$) of the electrode wiring material.

(10) B2 and C2, determined by w2 calculated from the above formula, are taken as their final coordinates.

(11) Now, the first and second leadout wirings are determined.

(12) Next, to determine the third leadout wiring, follow the same procedure from (2) to (10), except that the width w3 of the inclined linear wiring 42-3 is calculated from the following formula.

$$\left(\frac{e_2}{w_{TCP}} + \frac{m_2}{w_2} + \frac{p_2}{w_{LCD}}\right)R_{sq} = \left(\frac{m_3}{w_3} + \frac{p_3}{w_{LCD}}\right)R_{sq}$$

(13) This procedure is repeated until the n-th leadout wiring is determined. To determine the width of the inclined linear wiring 42-n, the following formular is used.

$$\left(\frac{e_{(n-1)}}{w_{TCP}} + \frac{m_{n-1}}{w_{n-1}} + \frac{p_{n-1}}{w_{LCD}}\right)R_{sq} = \left(\frac{m_n}{w_n} + \frac{p_n}{w_{LCD}}\right)R_{sq}$$

(14) After the coordinates An, Bn, En, Dn for up to the final n-th readout wiring determined, the resistance R of n-th leadout wiring is calculated from the following formula.

$$R = \left(\frac{e_n}{w_{TCP}} + \frac{m_n}{w_n} + \frac{p_n}{w_{LCD}}\right)R_{sq}$$

(15) The coordinate Bn of the n-th leadout wiring determines the y-axis height of the overall inclined linear wiring pattern. That is, in the first to (n−1)-th leadout wirings, the terminals 41-1 to 41-(n−1) are extended according to Bn. Then the resistances of the first to n-th leadout wiring are all equal to R.

(16) Finally, calculation is performed with the angle $\theta$ as a variable to determine the angle $\theta$ that makes the wire resistance R minimum. The coordinates A1, B1, E1, D1 to An, Bn, En, Dn of first to n-th leadout wirings are figured.

The coordinates A1, B1, E1, D1 of the first leadout wiring are determined from the following formulas.

$A_1 = (a_{x1}, a_{y1})$  $B_1 = (b_{x1}, b_{y1})$  $C_1 = (c_{x1}, c_{y1})$  $D_1 = (d_{x1}, d_{y1})$ $$E_1 = \left(\frac{b_{x1}+a_{x1}}{2}, \frac{b_{y1}+a_{y1}}{2}\right) \quad F_1 = \left(\frac{c_{x1}+d_{x1}}{2}, \frac{c_{y1}+d_{y1}}{2}\right)$$

$$e_1 = \frac{b_{y2}+a_{y2}}{2} - \frac{b_{y1}+a_{y1}}{2} \quad p_1 = 0 \quad w_1 = (c_{x1}-d_{x1})\sin\theta$$

$$m_1 = \sqrt{\left(\frac{c_{x1}+d_{x1}}{2} - \frac{b_{x1}+a_{x1}}{2}\right)^2 + \left(\frac{b_{y1}+a_{y1}}{2} - \frac{c_{y1}+d_{y1}}{2}\right)^2}$$

Detailed calculation formulas for the coordinates A1, B1, E1, D1 of the first leadout wiring are shown below.

$$a_{x1} = \frac{d_{TCP}}{2} \quad a_{y1} = 0$$

$$b_{x1} = a_{x1} + w_{TCP} \quad b_{y1} = \left(\frac{d_{LCD}}{2} + w_{LCD} - b_{x1}\right)\tan\theta$$

$$c_{x1} = \frac{d_{LCD}}{2} + w_{LCD} \quad c_{y1} = 0$$

$$d_{x1} = a_{x1} \quad d_{y1} = 0$$

The coordinates A2, B2, E2, D2 of the second leadout wiring are determined from the following formulas.

$A_2 = (a_{x2}, a_{y2})$  $B_2 = (b_{x2}, b_{y2})$  $C_2 = (c_{x2}, c_{y2})$  $D_2 = (d_{x2}, d_{y2})$ $$E_2 = \left(\frac{b_{x2}+a_{x2}}{2}, \frac{b_{y2}+a_{y2}}{2}\right) \quad F_2 = \left(\frac{c_{x2}+d_{x2}}{2}, \frac{c_{y2}+d_{y2}}{2}\right)$$

$$e_2 = \frac{b_{y3}+a_{y3}}{2} - \frac{b_{y2}+a_{y2}}{2} \quad p_2 = \frac{c_{y2}+d_{y2}}{2}$$

$$m_2 = \sqrt{\left(\frac{c_{x2}+d_{x2}}{2} - \frac{b_{x2}+a_{x2}}{2}\right)^2 + \left(\frac{b_{y2}+a_{y2}}{2} - \frac{c_{y2}+d_{y2}}{2}\right)^2}$$

Detailed calculation formulas for the coordinates A2, B2, E2, D2 of the second leadout wiring are shown below.

$$a_{x2} = \frac{d_{TCP}}{2} + w_{TCP} + d_{TCP}$$

$$b_{x2} = a_{x2} + w_{TCP}$$

$$c_{x2} = d_{x2} + w_{LCD}$$

$$d_{x2} = \frac{d_{LCD}}{2} + w_{LCD} + d_{LCD}$$

$$a_{y2} = -a_{x2}\tan\theta + b_{y1} + b_{x1}\tan\theta + d_{LCD}\sqrt{\tan^2\theta + 1}$$

$$b_{y2} = -b_{x2}\tan\theta + a_{y2} + a_{x2}\tan\theta + w_2\sqrt{\tan^2\theta + 1}$$

$$c_{y2} = -(c_{x2} - b_{x2})\tan\theta + b_{y2}$$

$$d_{y2} = -(d_{x2} - a_{x2})\tan\theta + a_{y2}$$

The coordinates An, Bn, En, Dn of the n-th leadout wiring are determined from the following formulas.

$A_n = (a_{xn}, a_{yn})$  $B_n = (b_{xn}, b_{yn})$  $C_n = (c_{xn}, c_{yn})$  $D_n = (d_{xn}, d_{yn})$ $$E_n = \left(\frac{b_{xn}+a_{xn}}{2}, \frac{b_{yn}+a_{yn}}{2}\right) \quad F_n = \left(\frac{c_{xn}+d_{xn}}{2}, \frac{c_{yn}+d_{yn}}{2}\right)$$

$$e_n = \frac{b_{y(n+1)}+a_{y(n+1)}}{2} - \frac{b_{yn}+a_{yn}}{2} \quad p_n = \frac{c_{yn}+d_{yn}}{2}$$

$$m_n = \sqrt{\left(\frac{c_{xn}+d_{xn}}{2} - \frac{b_{xn}+a_{xn}}{2}\right)^2 + \left(\frac{b_{yn}+a_{yn}}{2} - \frac{c_{yn}+d_{yn}}{2}\right)^2}$$

Detailed calculation formulas for the coordinates An, Bn, En, Dn of the second leadout wiring are shown below.

$$a_{xn} = \frac{d_{TCP}}{2} + (w_{TCP} + d_{TCP})(n-1)$$

$$b_{xn} = a_{xn} + w_{TCP}$$

$$c_{xn} = d_{xn} + w_{LCD}$$

$$d_{xn} = \frac{d_{LCD}}{2} + (w_{LCD} + d_{LCD})(n-1)$$

$$a_{yn} = -a_{xn}\tan\theta + b_{y(n-1)} + b_{x(n-1)}\tan\theta + d_{LCD}\sqrt{\tan^2\theta + 1}$$

$$b_{yn} = -b_{xn}\tan\theta + a_{yn} + a_{xn}\tan\theta + w_n\sqrt{\tan^2\theta + 1}$$

$$c_{yn} = -(c_{xn} - b_{xn})\tan\theta + b_{yn}$$

$$d_{yn} = -(d_{xn} - a_{xn})\tan\theta + a_{yn}$$

The leadout wirings are thus designed, it is possible to improve their area utilization efficiency (wiring efficiency). This in turn allows the lengths of the readout wirings to be shortened and the wire resistances to be reduced 30–40% from the conventional 500Ω–1 kΩ.

Because the reduction in resistance can contribute to the margin of the ON resistance of the drive semiconductor IC chip, the dimension of the semiconductor IC chip can be reduced.

Further, because the lengths of the leadout wirings can be shorter than the conventional ones, it is possible to reduce the dimensions of the liquid crystal display unit and therefore the cost of the manufacture.

Moreover, because the reduction in wire resistance can reduce distortions such as deformations of liquid crystal drive waveforms and crosstalks, the shadowing (uneven brightness) can be reduced, thereby improving the display quality.

Figure 4:
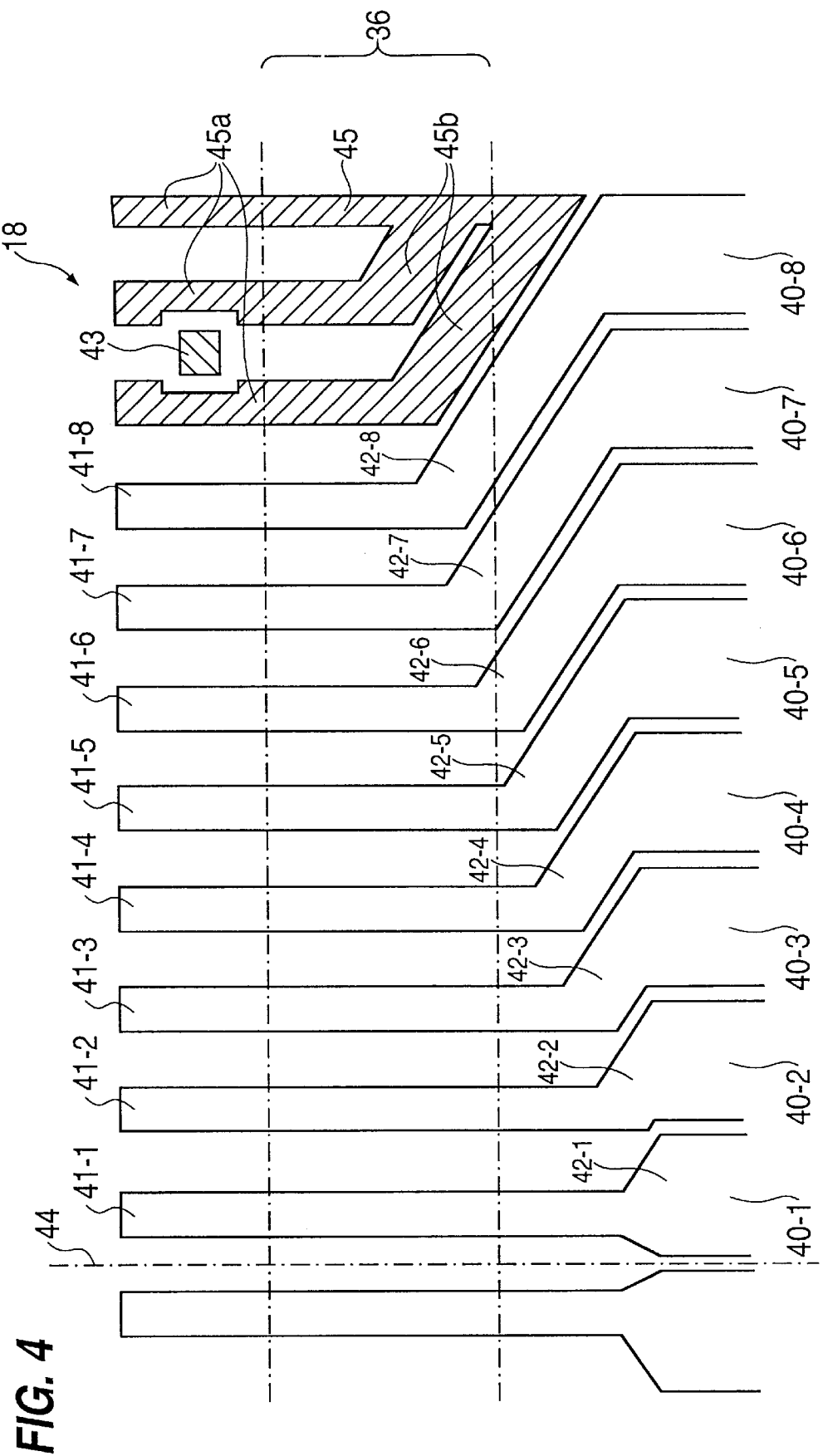
FIG. 4 is a partial plan view of the second embodiment showing leadout wirings on the electrode substrate applied to the liquid crystal display of this invention.

FIG. 4 is a plan view showing an essential portion of the leadout wiring section on the electrode substrate of the second embodiment of this invention.

Figure 7B:
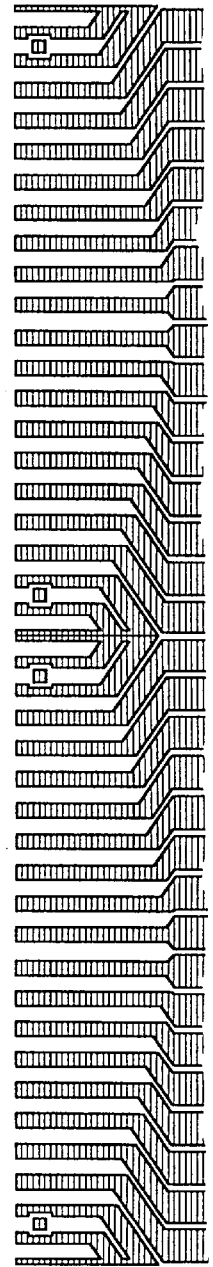
FIG. 7B is a partial plan view showing part of the second embodiment, whose area is about four times larger than that shown in FIG. 4.

FIG. 7B is a plan view covering an area about four times as large as the area of FIG. 4.

This embodiment has, in addition to the configuration of the first embodiment, dummy electrodes 45 in spaces between the terminals 41-n that are connected to the TCP and arranged in line at the end of the electrode substrate.

The dummy electrodes 45 have a shape with which the spaces between the terminals 41-n are filled, that is, they consist of parallel electrodes 45a with the same pitches as those of the terminals 41-n and inclined linear electrodes 45b.

The inclined linear electrodes 45b are so arranged at as to have the same angle and pitch as those of the inclined linear wirings 42-8, which correspond to the outermost adjacent terminals 41-8, of the terminal group 41-n, between the inclined linear wirings 42-8.

In this embodiment, the dummy electrodes 45 are formed of an ITO film and electrically floating.

In the conventional technique, because there are gaps between the terminals 41-n connected to the TCP and the terminals 41 are made of the ITO film as thick as 0.2–0.3 μm, the height difference is produced between the area where the terminals exist and the area where they do not. In the mass production of the liquid crystal display unit, the pattern of this height difference is transferred to the rubbing roller for the alignment treatment (rubbing) on the molecular alignment layer formed on the display electrodes 40. The alignment treatment using this rubbing roller results in irregular rubbing streaks formed on the molecular alignment layer, degrading the display quality. In this embodiment, however, the spaces between TCPs (between terminals 41) are filled with the dummy electrodes 45, so that the spaces can be the similar surface roughness condition or the rubbing condition to those on both sides. This prevents the forming of irregular rubbing streaks on the molecular alignment layer, unlike the conventional technique, and thereby improves the display quality.

Further, because the provision of the dummy electrodes 45 in the spaces between TCPs eliminates the recesses about 0.2 μm deep between TCPs, it is possible to make the gap between the upper and lower substrates uniform. Hence, there is no tonal irregularity formed at the frame edge portion, thus realizing an unlit area being uniformly black. Precise control of the gap between the upper and lower substrates can eliminate rainbow, contributing to improved display quality.

Figure 5:
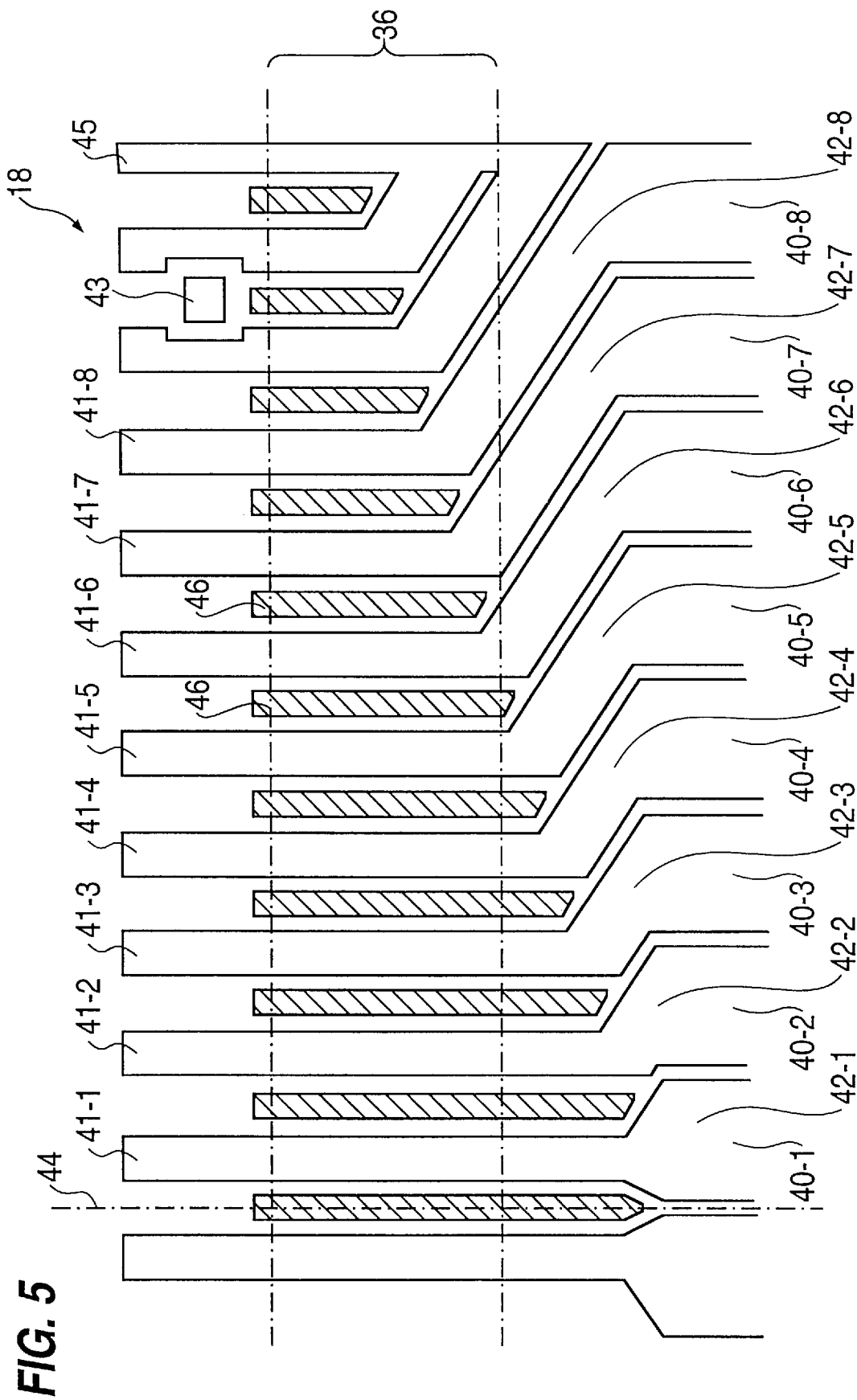
FIG. 5 is a partial plan view of the third embodiment showing leadout wirings on the electrode substrate applied to the liquid crystal display of this invention.

FIG. 5 is a plan view showing an essential portion of the leadout wiring section of the electrode substrate as the third embodiment of this invention.

Figure 7C:
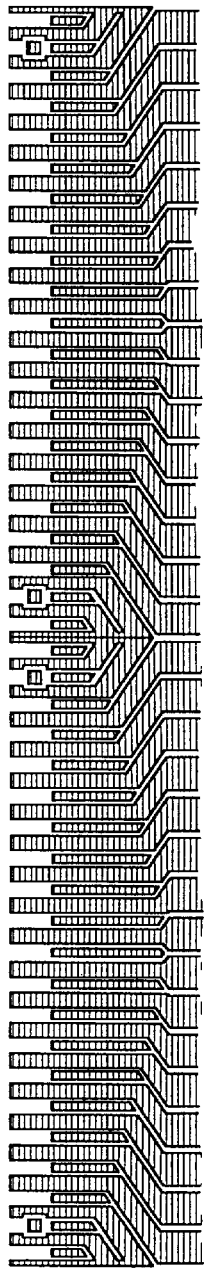
FIG. 7C is a partial plan view showing part of the third embodiment, whose area is about four times larger than that shown in FIG. 5.

FIG. 7C is a plan view covering an area about four times as large as the area of FIG. 5.

This embodiment has, in addition to the configuration of the first and second embodiment, dummy electrodes 46 in spaces between the terminals 41 in the frame edge portion, or unlit area, outside the display section (lit area) where electrodes of the upper and lower electrode substrate cross, and on the inner side of the sealant 36 of the completed liquid crystal display unit (on the side where liquid crystal exists), as shown in FIG. 5.

The dummy electrodes 46 have equal pitches, and the distances between the dummy electrodes 46 and the terminals 41 on both sides (intervals between the dummy electrodes and the terminals) are equal. In this embodiment, these distances are equal to the distances between the adjacent inclined linear wirings 42.

In this embodiment, the dummy electrodes 46 are formed of ITO film and electrically floating.

Because the dummy electrodes 46 are provided in the gaps between the terminals 41 in the area including the frame edge portion, it is possible to prevent leakage of light through the gaps between the terminals 41 in the frame edge portion. Further, the in-plane densities of the terminals 41 and of the extended portion of the terminals 41 are equal, making the gap between the upper and lower substrates uniform.

Figure 28:
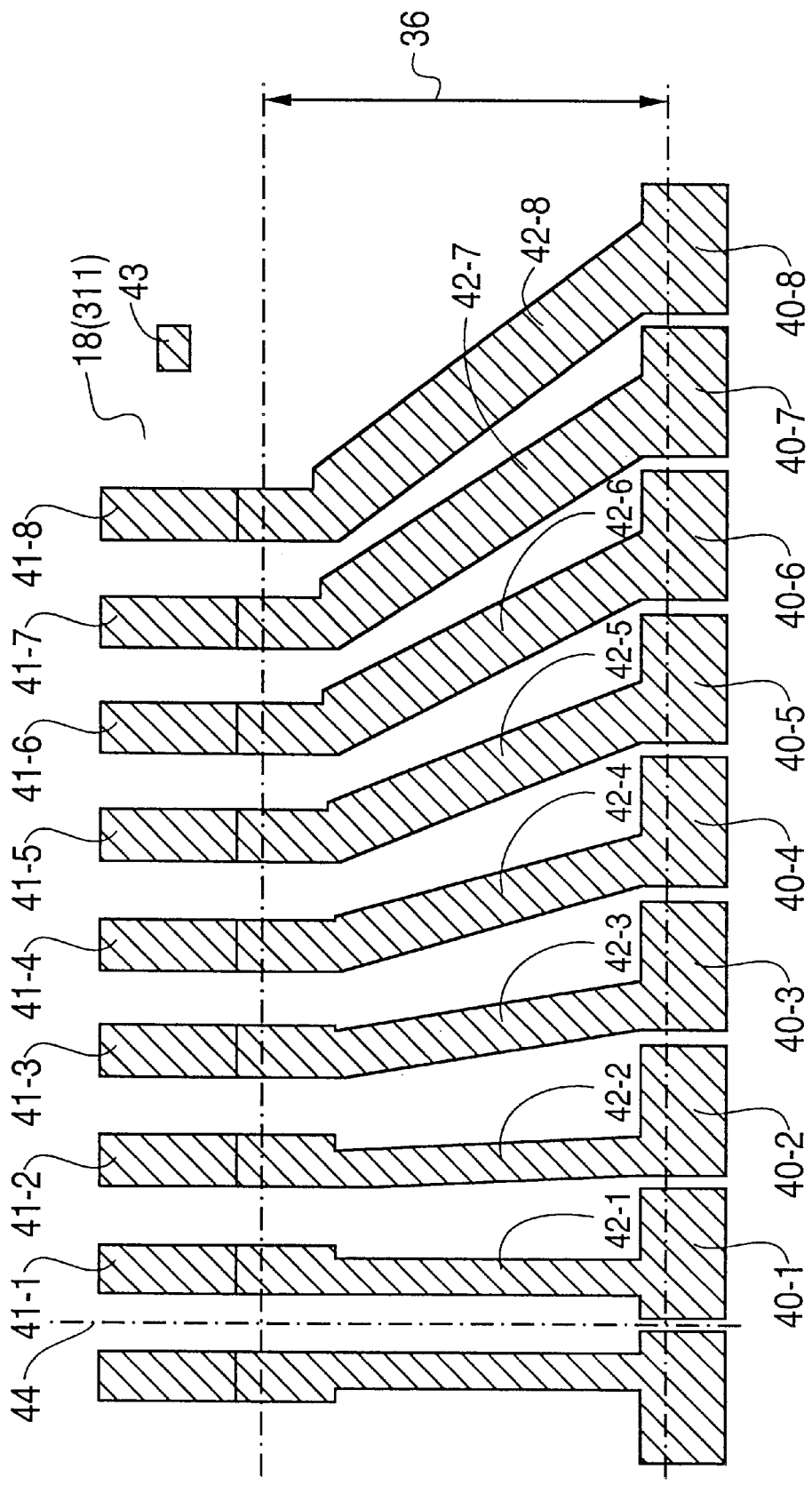
FIG. 28 is a partial plan view showing leadout wirings on the electrode substrate used in a conventional liquid crystal display.
Figure 29A:
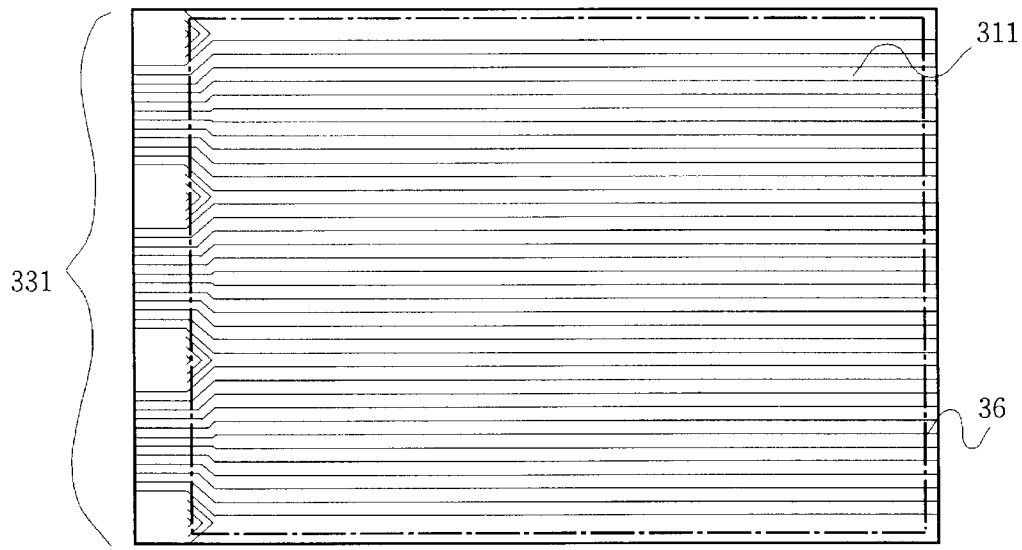
FIG. 29A is a schematic plan view showing electrode wiring on the scanning electrode substrate used in the conventional liquid crystal display.
Figure 29B:
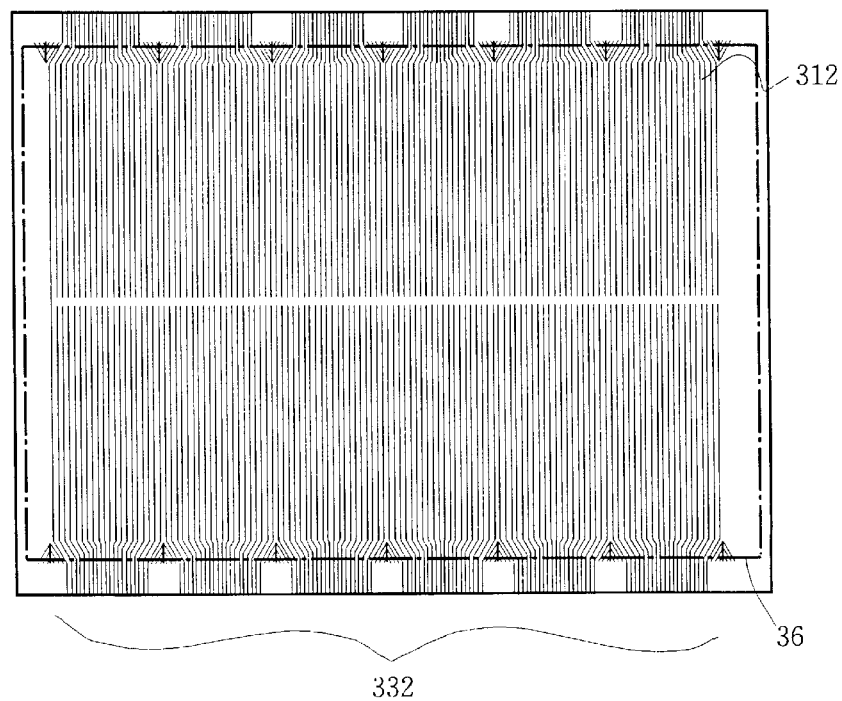
FIG. 29B is a schematic plan view showing electrode wiring on the signal electrode substrate used in the conventional liquid crystal display.

Conventionally, as shown in FIG. 28, because the inclined linear wirings 42 of the leadout wirings are formed radial, the intervals between the inclined linear wirings 42 decrease from the display electrodes 40 toward the terminals 41. This causes uneven tonal irregularity in the frame edge portion being uniformly black. In this embodiment, however, the provision of the dummy electrodes 45 and 46 makes the gaps in the frame edge portion uniform, eliminating the above-mentioned problem and realizing a uniformly black frame edge portion. This in turn improves the display quality.

Further, because in the conventional liquid crystal display unit, the spacers are supported by the display electrodes 40 and the inclined linear wirings 42, both formed of the ITO film as thick as 0.2–0.3 μm on the upper and lower electrode substrates, the spacers where no electrodes are present are free and not controlled. Moreover, the conventional, radially arranged, inclined linear wirings 42 have nonuniform wiring densities, as mentioned above, so that the gap variation in the frame edge portion cause color variation.

Particularly in the STN-LCD that requires a high-precision gap (±0.1 μm) between the electrode substrates, the gap is greatly influenced by the effective density of an area where the spacers are provided. Because in this embodiment has the dummy electrodes 45, 46, the gaps in the frame edge portion can be made equal, solving this problem, eliminating the color variation due to gap variation in the frame edge portion, and improving the display quality.

Figure 6:
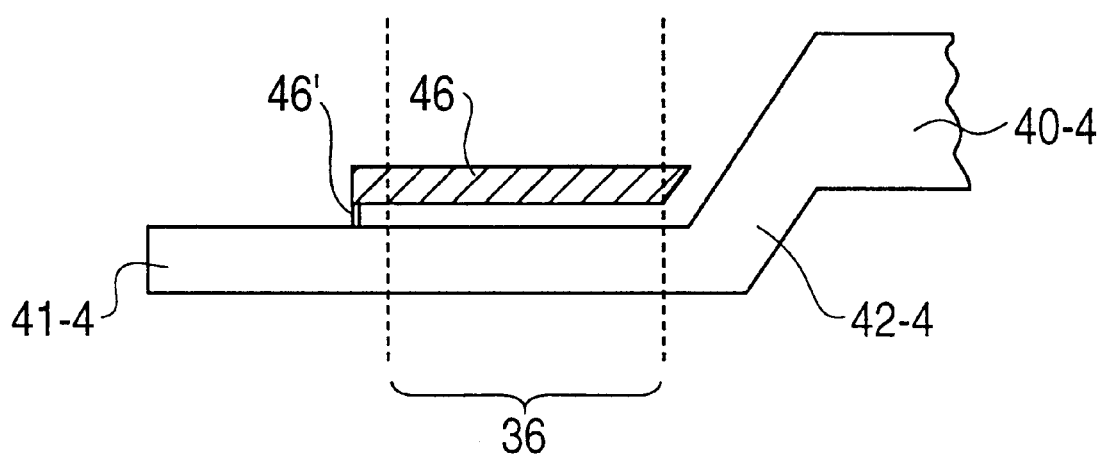
FIG. 6 is a diagram showing the connection relationship when the display electrode terminal of the third embodiment and the interterminal dummy electrode are electrically connected.

While the dummy electrodes 46 in this embodiment are electrically floating, it is possible to connect the dummy electrodes 46 at a point by a minimum pattern connecting portion 46', as shown in FIG. 6, so that the resistance of the leadout wiring is equal to those of other leadout wirings.

Figure 11A:
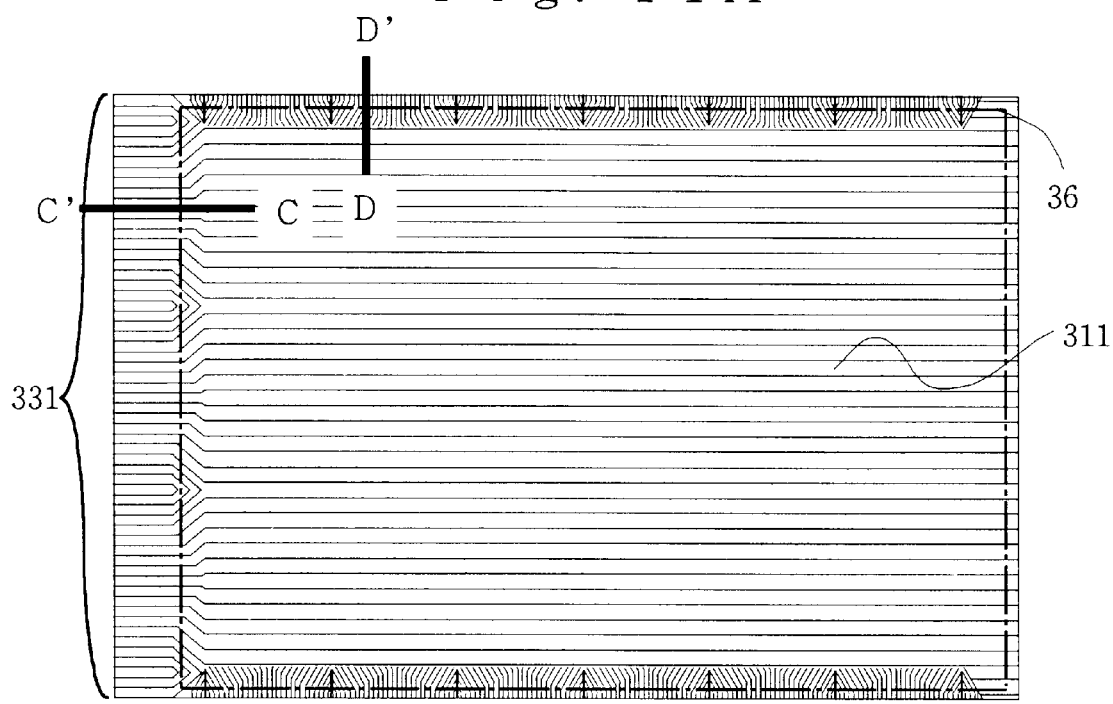
FIG. 11A is a plan view showing the electrode wiring of the scanning electrode substrate of the liquid crystal display unit board to which the first to third embodiments are adopted.
Figure 11B:
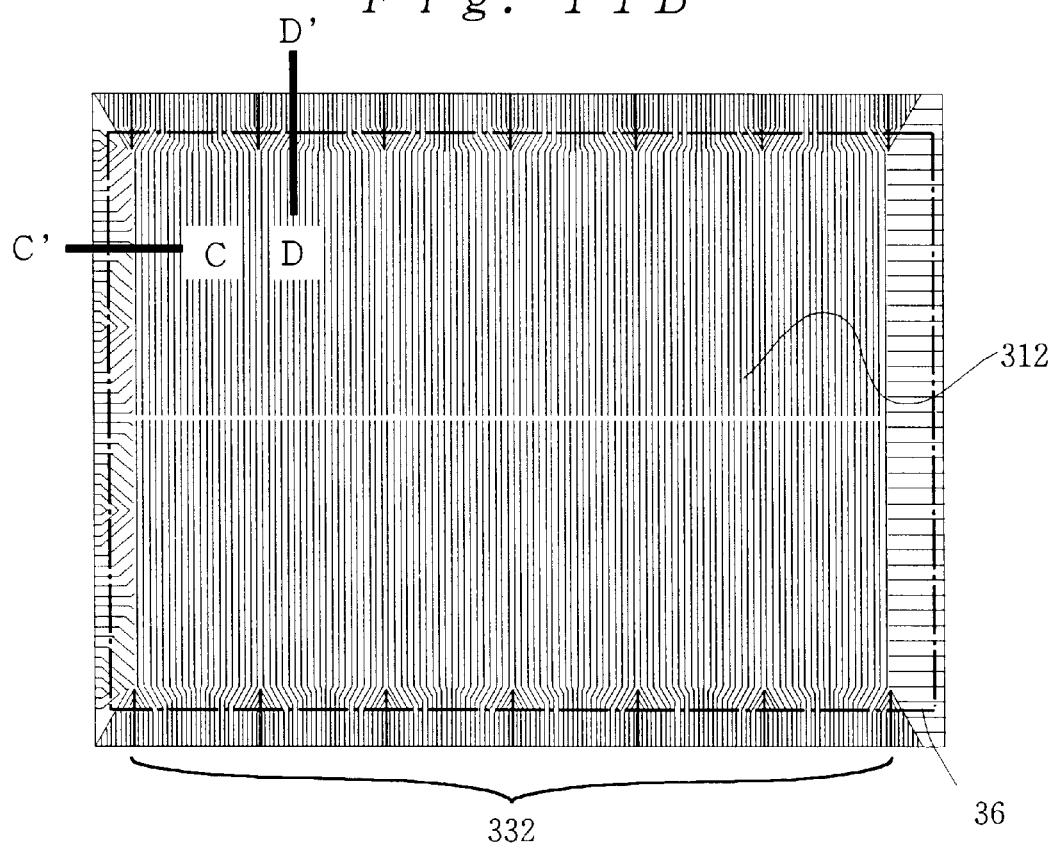
FIG. 11B is a plan view showing the electrode wiring of the signal electrode substrate of the liquid crystal display unit substrate to which the first to third embodiments are adopted.

FIGS. 11A and 11B are schematic plan views of an upper electrode substrate (FIG. 11A) and a lower electrode substrate (FIG. 11B) that are assembled in such a way that the surfaces of the substrates on which electrodes including the leadout wiring and the dummy electrodes of the embodiments of the invention are formed to oppose each other. The dummy electrodes on the upper electrode substrate have the same shapes as those of the lower electrodes provided in the peripheral portion of the liquid crystal display unit, and the dummy electrodes in the lower electrode substrate have the same shapes as those of the upper electrodes provided in the peripheral portion of the liquid crystal display unit.

Because the terminals, readout wirings and dummy electrodes formed at the end portion of one of the two electrode substrates 311, 312 are formed on the surface facing the other electrode substrate 312 or 311 in this way, it is possible to make the gap between the electrode substrates uniform and therefore the frame edge portion is uniformly black. In other words, it is possible to eliminate color variation due to gap variation in the frame edge portion and thereby improve the display quality.

Figure 8:
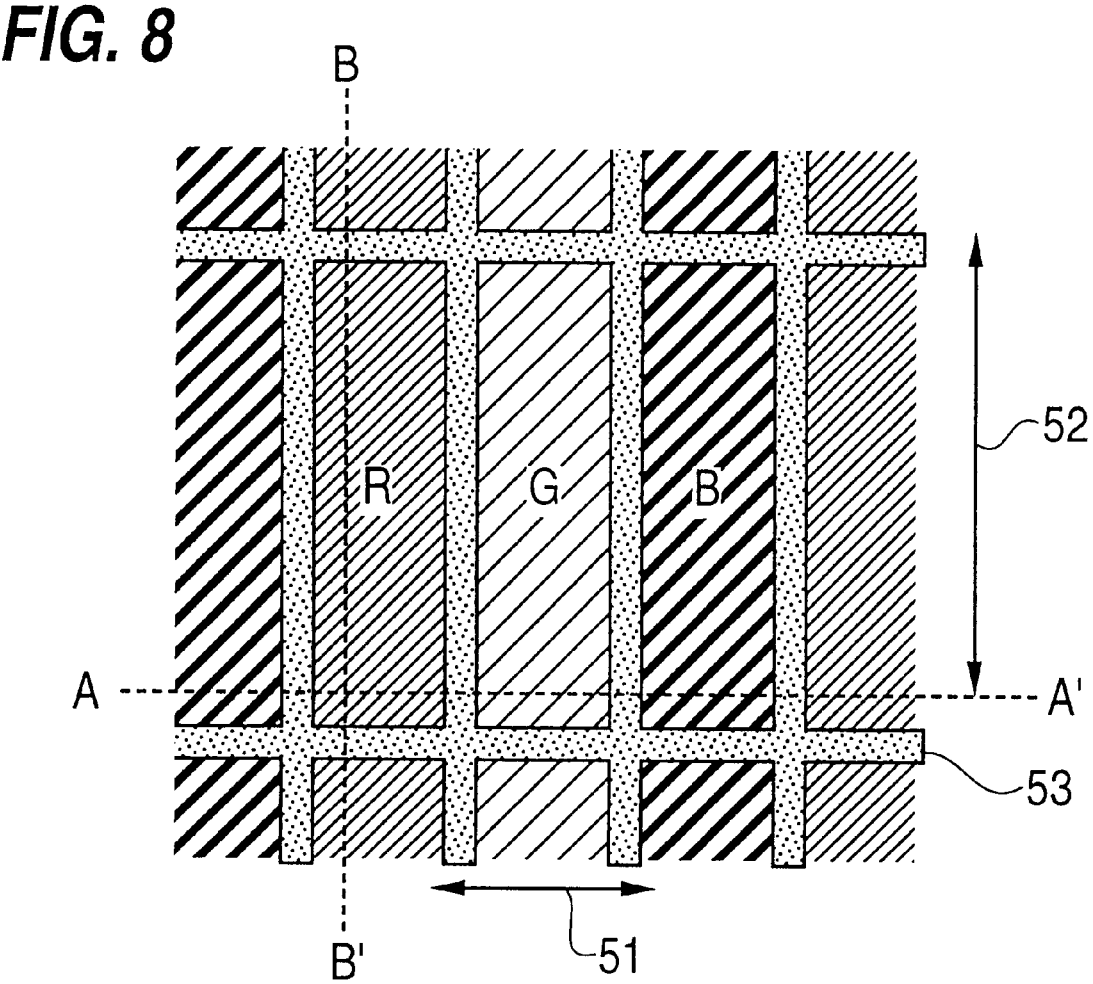
FIG. 8 is an enlarged plan view of color filters when two stacked electrode substrates are viewed from above.

FIG. 8 is a plan view showing an essential portion of the liquid crystal device to which this invention can be applied.

When viewed from above, the liquid crystal device has scanning electrodes extending in a horizontal direction 51 and signal electrodes extending in a vertical direction 52.

FIG. 9A is a cross section taken along the line A–A' of FIG. 8 and FIG. 9B is a cross section taken along the line B–B' of FIG. 8.

Reference numeral 31 represents an upper polarizing plate; 33 an upper retardation film; 311 an upper electrode substrate 311; 53 a black matrix; 333 a color filter layer; 323 a planarizing film; 331 an upper electrode (scanning electrode); 321 an upper molecular alignment layer; 350 a liquid crystal layer; 54 a spacer bead; 322 a lower molecular alignment layer; 55 an electrode protective film; 332 a lower electrode 332 (signal electrode); 312 a lower electrode substrate; 34 a lower retardation film; and 32 a lower polarizing plate.

Figure 10:
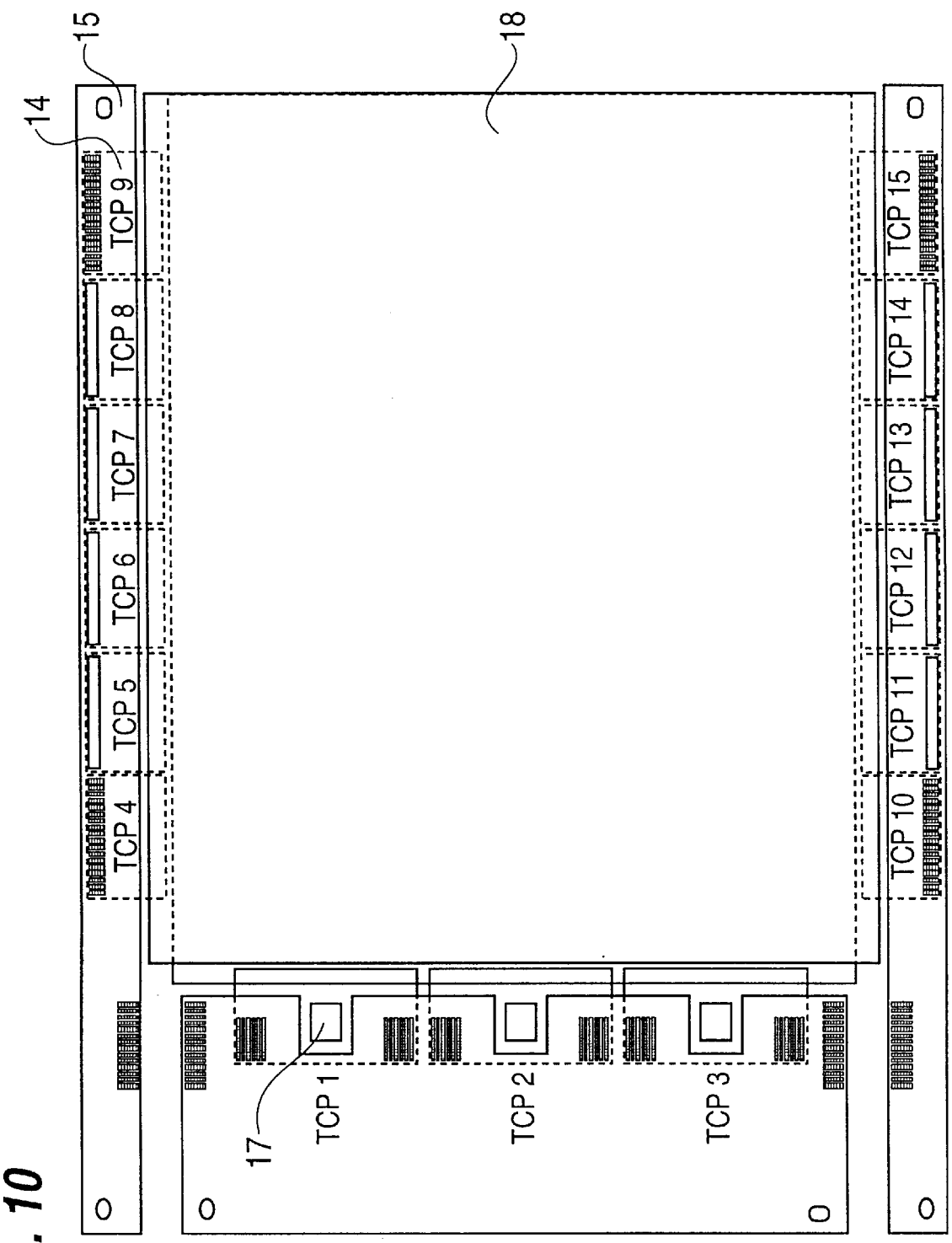
FIG. 10 is a schematic plan view showing the connection between a printed circuit board, a TCP mounted with the drive LSI chip, and a liquid crystal display unit to which this invention can be applied.

FIG. 10 is a plan view showing the connection between a printed circuit board, TCPs mounted with a drive LSI chip and a liquid crystal unit of a liquid crystal display to which this invention can be applied.

As shown in FIG. 10, provided on the periphery of the liquid crystal device 18 are signal electrode TCPs 14 and scanning electrode TCPs 17 both for connection of the liquid crystal device 18 to the printed circuit board 15.

The invention has been described in connection with the embodiments. It is noted, however, that the invention is not limited to these embodiments but that various modifications may be made without departing from the gist of this invention. For example, the above embodiments are applications to the simple matrix liquid crystal display, the invention can also be applied to an active matrix liquid crystal display that employs thin-film transistors as switching devices. When the invention is applied to the active matrix liquid crystal display, the display electrodes of FIG. 1 are scanning signal lines (i.e., gate signal lines or horizontal signal lines) or video signal lines (i.e., drain signal lines or vertical signal lines) in the substrate where the switching devices are installed.

FIGS. 11A and 11B are schematic plan views showing the electrode wirings on the upper and lower electrode substrates of the embodiments.

In the fourth embodiment shown in FIGS. 11A and 11B, a part of the upper and lower electrodes, a part of their terminals, leadout wirings connecting these (these will be generally referred to as a terminal section), the dummy electrodes 45 provided between the terminal groups and at least a part of the dummy electrodes 46 provided between the terminals—all these located outside the effective display area (which is formed of intersections of the upper electrodes 331 and the lower electrodes 332 when viewed from a direction perpendicular to the surface of the substrates 311, 312)—are replicated on the mutually facing surfaces of the end portions of the mutually opposing substrates 311, 312. The electrode patterns to be duplicated are the same so that they are completely superposed when viewed from a direction perpendicular to the surface of the substrates of the completed liquid crystal device.

The duplicated terminal section (opposing dummy electrodes of the signal drive element electrodes) is formed on the surface of the end portion of the upper electrode substrate 311, and a part of the terminal section of the lower electrodes 332 on the surface, facing the upper electrode substrate 311, of the end portion of the lower electrode substrate 312 is replicated in the same pattern using the same material.

The duplicated terminal section (opposing dummy electrodes of the scanning drive element electrodes) is formed on the surface of the end portion of the lower electrode substrate 312, and a part of the terminal section of the upper electrodes 331 on the surface, facing the lower electrode substrate 312, of the end portion of the upper electrode substrate 311 is replicated in the same pattern using the same material.

The duplicated terminal sections are electrically floated in order to prevent the liquid crystal between the duplicated terminal sections 1 and the terminal sections facing the duplicated terminal sections 1 from being turned on. Also when dummy electrodes 46 oppose each other at the terminal sections, the duplicated terminal sections are electrically floated to prevent the liquid crystal between them from being turned on. As a result, even when the dummy electrodes 46 are charged by static electricity, the electric charges are released by high-resistance leakage through the liquid crystal, preventing the liquid crystal from being lit.

More specifically, a part of the pattern of the terminal section of the upper electrodes 331 (the terminal section including leadout wirings and dummy electrodes 45, 46) at one end portion of the upper electrode substrate 311 is copied and formed at the opposing end portion of the lower electrode substrate 312. Next, a part of the pattern of the terminal section of the upper electrodes 331 at the other end portion of the upper electrode substrate 311 is similarly copied and formed at the opposing end portion of the lower electrode substrate 312. Next, a part of the pattern of the terminal section of the lower electrodes 332 at one end portion of the lower electrode substrate 312 is copied and formed at the opposing end portion of the upper electrode substrate 311.

Next, a part of the pattern of the terminal section (through not connected to the TCP terminals of the drive elements, the section will be also referred to as a terminal section in this invention) of the lower electrodes 332 at the other end portion of the lower electrode substrate 312 on the liquid crystal seal-in side is similarly copied and formed at the opposing end portion of the upper electrode substrate 311. Thereafter, the two electrode substrates 311, 312 are stacked and assembled, and the opposing terminal sections of the same pattern are completely superposed when viewed from a direction perpendicular to the substrate surfaces. The duplicated terminal sections, though superposed in the same pattern of the terminal sections of the upper and lower electrodes 331, 332, are electrically floating, so that application of the drive voltage to the upper electrode 331 and lower electrode 332 does not result in abnormal lighting.

In other words, in a conventional liquid crystal device having the stacked upper and lower electrode substrates 311, 312, although the display section has the electrodes 331, 332 on both substrates 311, 312, the terminal section has electrodes on only one substrate. This means that the gap at the terminal section is greater than the gap at the other section by the thickness of the ITO film which is as thick as 0.2–0.3 $\mu$m and which constitutes the upper and lower electrodes, making the spacer free and making the gap control ineffective. Particularly in a liquid crystal device such as an STN-LCD that requires high-precision of the gap between the upper and lower electrode substrates ($\pm 0.1$ $\mu$m), the gap variation at the peripheral portion or so-called a frame edge portion—which is an unlighted area inside the sealant of the finished liquid crystal device (on the side where liquid crystal is interposed) and outside the display section (lighted area)—changes optical characteristics of the STN liquid crystal, causing color variation in the display section. In the liquid crystal device of this embodiment which has the upper electrode substrate 311 and the lower electrode substrate 312 stacked together, however, the same patterns of electrodes are provided on both substrates at the terminal section as well as at the display section. This allows the gap at the terminal section to be equal to the gap at the display section, thereby preventing color variation at display section due to gap variation, and improving the display quality.

Further, because the layer structure of the unlit area is made equal to that of the lit area to make the gap uniform over the unlit and lit areas, it is possible to prevent the raised or recessed surface of areas where terminals exist and where they do not from being transferred to the rubbing roller, which performs the alignment treatment (rubbing) of the molecular alignment layer formed on the electrodes. This in turn prevents uneven rubbing streaks from being formed on the molecular alignment layer and prevents the display quality from deteriorating. This construction also prevents tonal variation due to nonuniform gap from being produced at the frame edge portion which should be uniformly black. It is therefore possible to make the frame edge portion uniformly black and improve the display quality.

The terminal section in this invention may include the terminals of the upper and lower electrodes 331, 332, the leadout wirings connecting the upper and lower electrodes 331, 332 and their terminals, or the ends of the upper and lower electrodes 331, 332. When the terminal section is not connected to the drive elements, it may mean the ends of the transparent electrodes.

Figure 12A:
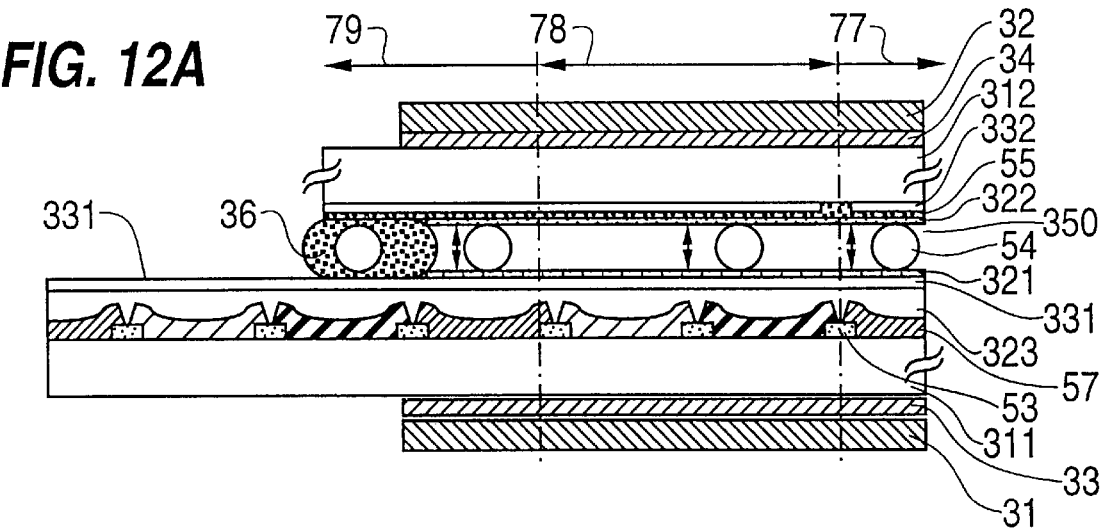
FIG. 12A is a cross section taken along the line C–C' of FIG. 11 when the scanning electrode substrate of FIG. 11A is stacked on the signal electrode substrate of FIG. 11B.
Figure 12B:
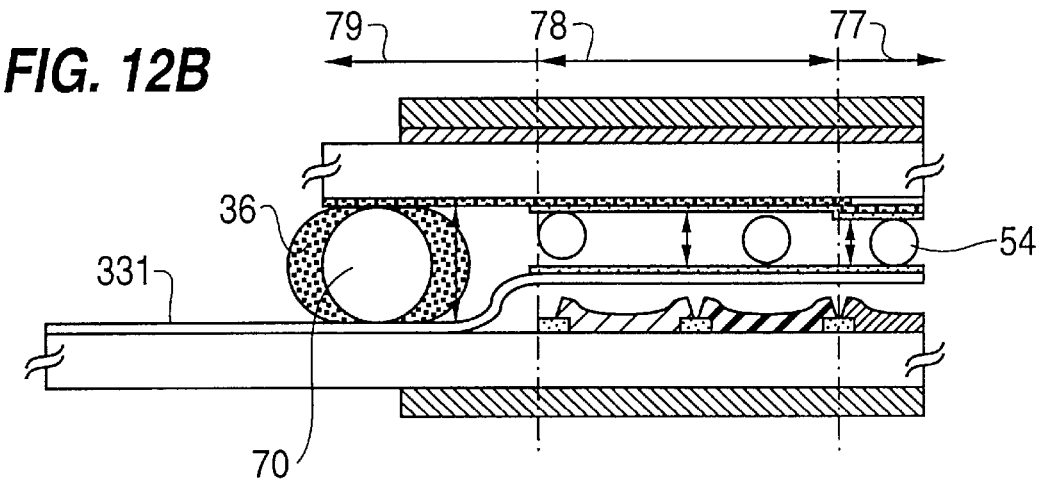
FIG. 12B is a cross section of the same portion in the conventional apparatus (cross section taken along the line C–C' of FIG. 29A)
Figure 13A:
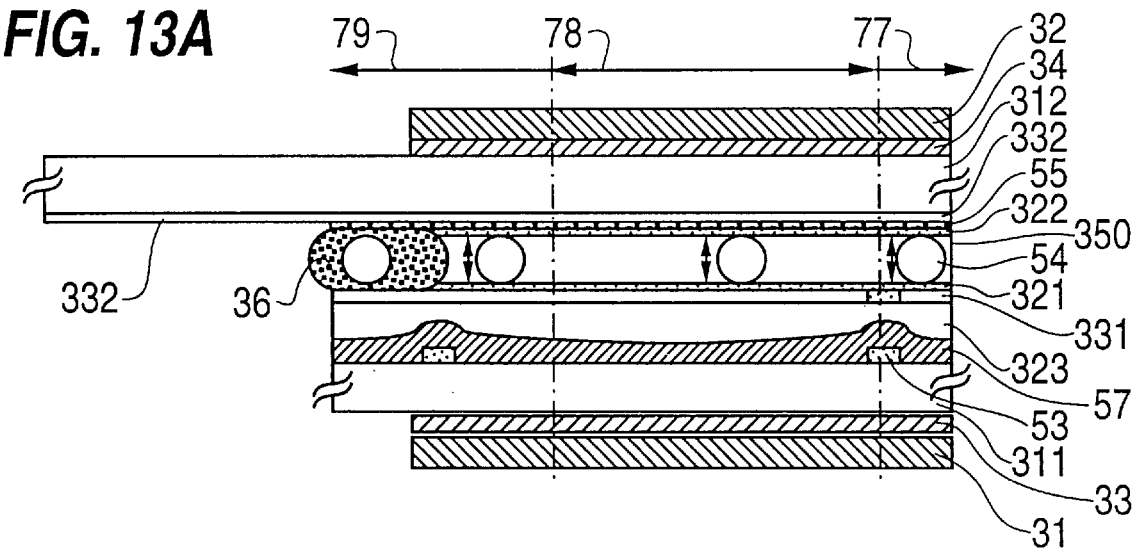
FIG. 13A is a cross section taken along the line D–D' of FIG. 11 when the scanning electrode substrate of FIG. 11A is stacked on the signal electrode substrate of FIG. 11B.
Figure 13B:
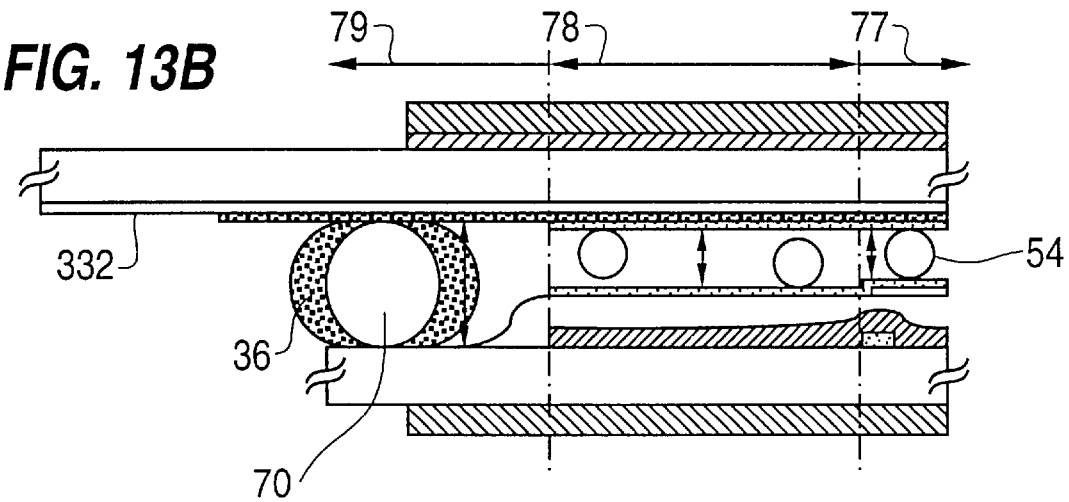
FIG. 13B is a cross section of the same portion in the conventional apparatus (cross section taken along the line D–D' of FIG. 29B)

FIG. 12A is a cross section taken along the line C–C' of FIGS. 11A and 11B; and FIG. 13A is a cross section taken along the line D–D'. FIG. 12B and FIG. 13B are cross sections of the corresponding portions in the conventional apparatus for comparison with FIGS. 12A and 13B respectively.

In FIGS. 12 and 13, reference numeral 31 represents an upper polarizing plate, 33 a retardation film, 311 an upper electrode substrate, 53 a black matrix, 57 a color filter, 323 a planarizing film, 331 an upper electrode (scanning electrode), 321 an upper molecular alignment layer, 350 a liquid crystal layer, 54 a spacer bead, 322 a lower molecular alignment layer, 55 an electrode protective film 332 a lower electrode (signal electrode), 312 a lower electrode substrate, 34 a lower retardation film, and 32 a lower polarizing plate. In FIGS. 12B and 13B, numeral 70 denotes a conventional spacer in the sealing section.

In a conventional color STN-LCD, the black matrix 53, color filter 57, and the planarizing film 323 for improving the planarity of their surfaces, all provided on one of the substrates, are formed and fixed at the inside the sealant 36, as shown in FIGS. 12B and 13B. The total thickness of the black matrix 53, color filter 57 and planarizing film 323 is as large as about 4 μm and the height difference of the sealing portion 36, i.e., the gap between the two substrates is so large that color variation is caused in the display section mentioned above. In this conventional structure, the size of the spherical or cylindrical spacers for defining the gap between the substrates used in the sealing section is different from that of spacers used in the display section (for example, the spacer 70 in the sealing portion 36 is glass and about 11 μm in diameter, and the spacer 54 in the display section 77 is a polymer bead of about 6.2 μm in diameter). Hence, the gap control has been difficult.

In this embodiment, however, as shown in FIGS. 12A and 13A, the black matrix 53, color filter 57 and planarizing film 323 are formed in an area extending from the display section 77 to the region (sealing portion 79) where sealant 36 for joining the substrates together is formed, and to a portion below the upper electrodes 331 at the end portion of the upper electrode substrate 311. This makes the gap uniform over an area ranging from the display section 77 to the end of the substrates 311, 312. Further, it is possible to use the spacers 36 of the same diameter as the spacers in the sealant 36 of the display 10 section 77 and the sealing section 79, facilitating the control of gap between the substrates. The black matrix 53 and the color filter 57 each have the same shape and structure from the display section 77 to the end portion outside it. That is, the black matrix 53 is an extension of lattice and the color filter 57 is an extension of stripe. Because the black matrix 53 under the sealant 36 and the upper electrodes 331 is lattice-shaped and the color filter 57 is stripe-shaped, they have a fine rough surface, improving the adhesion of the planarizing film 323 and therefore the reliability. In the conventional apparatus, because only the planarizing film is extended outside, the planarizing film is formed on the flat substrate, resulting in a poor adhesion and thereby causing the planarizing film to be easily separated.

Although in this embodiment the black matrix 53, color filter 57, planarizing film 323 and upper electrodes 331 are extended to the end of the upper electrode substrate 311 outside the sealant 36, it is also possible to extend the lower molecular alignment layer 322 except for the sealing portion. This is because the adhesion of the molecular alignment layer to the sealant is bad and separation easily occurs. Further it is possible to provide only one of the black matrix 53, color filter 57 and planarizing film 323.

Though not shown, the color filter 57 is cut off at a portion where the aligning mark (denoted by 43 in FIG. 4) is provided so that the aligning mark, which is used when TCP is mounted and connected to the upper electrode 331 of the upper electrode substrate 311 and to the lower electrode 332 of the lower electrode substrate 312, can be seen from perpendicularly above or below the substrates.

Figure 14A:
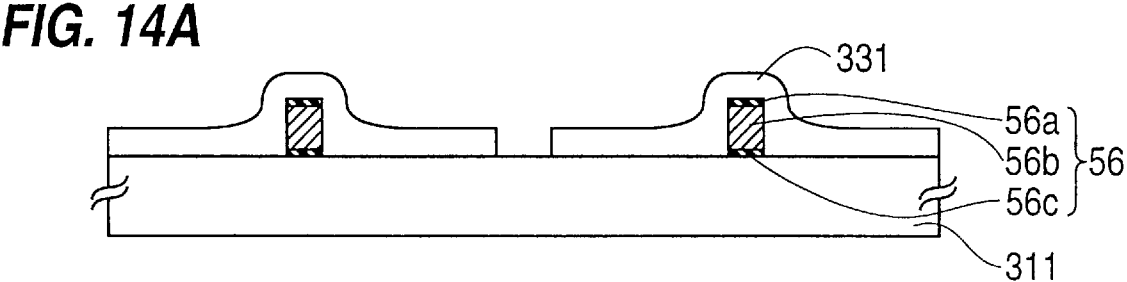
FIG. 14A is a cross section of a BMI (buried metal in ITO) structure in which a metal auxiliary electrode is buried in the display electrode.
Figure 14B:
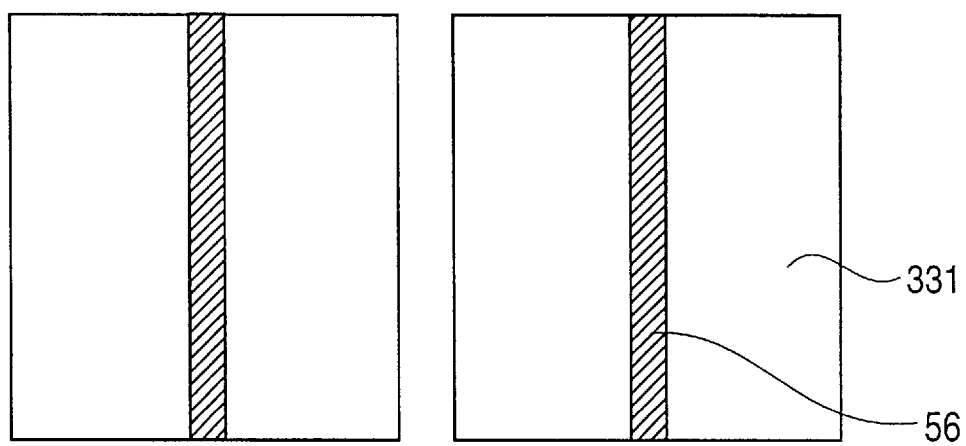
FIGS. 14B and 14C are a schematic plan view and a cross section, respectively, when a chromium film is simply applied over the ITO.
Figure 14C:
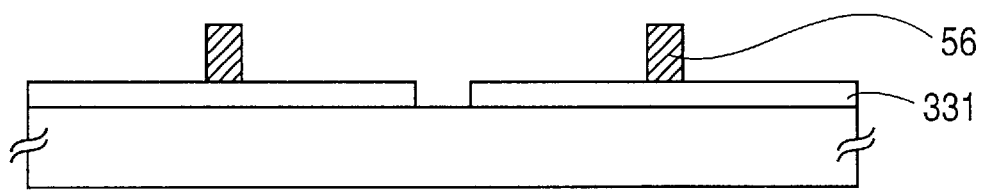

Next, the fifth embodiment of this invention is described referring to FIGS. 14A, 14B and 14C.

FIG. 14A is a cross section of ITO using a metal auxiliary electrode according to this invention. FIGS. 14B and 14C are shown for comparison with FIG. 14A. FIG. 14B is the plan view of the metal auxiliary electrode and FIG. 14C is the cross section of FIG. 14B.

Numeral 311 denotes an electrode substrate (this is true of 312, but 311 will be used as a representative in the following description). Numeral 331 denotes a transparent electrode made of ITO film (this is true of 332, but 331 will be used in the following description). Reference number 56 represents a metal auxiliary electrode made of, say, Cr film formed under the transparent electrode 331.

The metal auxiliary electrode 56 shown in FIGS. 14B and 14C is formed of one layer of Cr film and located below the center of the transparent electrode 331 made of ITO film in such a way that it is parallel to and narrower in width than the transparent electrode 331. The transparent electrode made of ITO film is about 0.2 μm thick and about 300 μm wide, and the metal auxiliary electrode 56 is about 0.3 μm thick and about 20–30 μm wide.

The metal auxiliary electrode 56 of such a structure involves the following problems.

(1) Because the Cr resistance is high, the wiring resistance can only be reduced by about 20%. When, for example, the metal auxiliary electrode 56 made of Cr film about 0.3 μm thick and about 20 μm wide is formed over the transparent electrode 331 made of ITO film with a film thickness of about 0.2 μm, a width of about 300 μm and a sheet resistance of about 10 Ω/q, the apparent sheet resistance is reduced to only about 8 Ω/q.

(2) When the width of the metal auxiliary electrode 56 made of Cr film is increased to further reduce the wiring resistance, the display opening factor of the liquid crystal device is reduced darkening the screen. When the thickness of the metal auxiliary electrode 56 of Cr film is greater than 0.3 μm, cracks will develop in the Cr film, easily causing wiring breakage. If wiring is broken, the metal auxiliary electrode no longer functions as a shunt (reduction of resistance) and it is difficult to ensure uniformity of the gap between the upper and lower electrode substrates.

(3) When a metal auxiliary electrode 56 having a thickness of about 0.3 μm and a width of about 20 μm and made of one layer of Al film instead of Cr film is formed over the transparent electrode 331, as shown in FIGS. 14B and 14C, the apparent sheet resistance of the transparent electrode 331 of ITO film is reduced to 2 Ω/q or one fifth. The Al film, however, has a property of being easily oxidized and may be corroded during the manufacture of the liquid crystal device by the acid or alkali used.

With these problems taken into consideration, the metal auxiliary electrode 56 of an embodiment of this invention consists of three layers—a lower layer Cr film 56a, an Al film 56b and an upper layer Cr film 56c—and is arranged at the center of the transparent electrode between the electrode substrate 311 and the transparent electrode 331 of ITO film in such a way that the metal auxiliary electrode 56 is parallel to and narrower in width than the transparent electrode 331, as shown in FIG. 14A. The transparent electrode 331 of ITO film is about 0.2 μm thick and about 300 μm wide; the upper and lower Cr films 56a, 56c about 0.05 μm thick; the Al film 56b about 0.3 μm thick; and the metal auxiliary electrode 1 about 20 μm wide.

With this construction, (1) Al is used for the main material of the metal auxiliary electrode 56 of the embodiment 1, so that the apparent sheet resistance can be educed to about 1–2 Ω/q or about one fifth to one tenth. This reduces the shadowing to such an extent that it no longer can be observed by the user, in other words, the display quality is improved.

(2) Because the Al film 56b easily corroded by acid and alkali is covered with the transparent electrode 331 of ITO film, the Al film 56b can be protected against corrosion by acid and alkali used during the manufacture of the liquid crystal device.

(3) Because the Cr films 56a, 56c are interposed between the Al film 56b and the electrode substrate 311 made of glass and between the Al film 56b and the transparent electrode 331 made of ITO film, the adhesion of the Al film 56b to the electrode substrate 311 and to the transparent electrode 331 is improved, thereby preventing separation of the metal auxiliary electrode 56 and improving the electrical connectavility and reliability. The use of Ni film in place of Cr film produces a similar effect.

Figure 15:
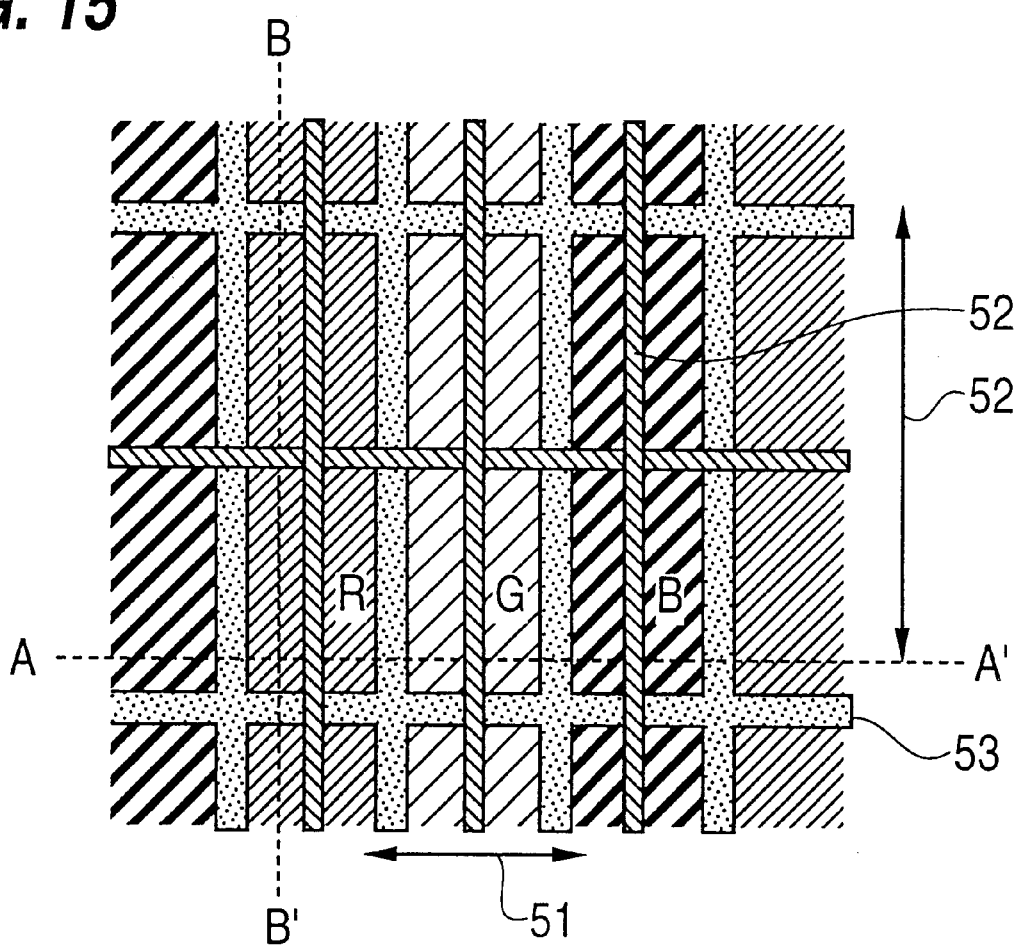
FIG. 15 is a schematic, enlarged plan view showing the liquid crystal display unit to which the structure of FIG. 14A is applied.
Figure 16A:
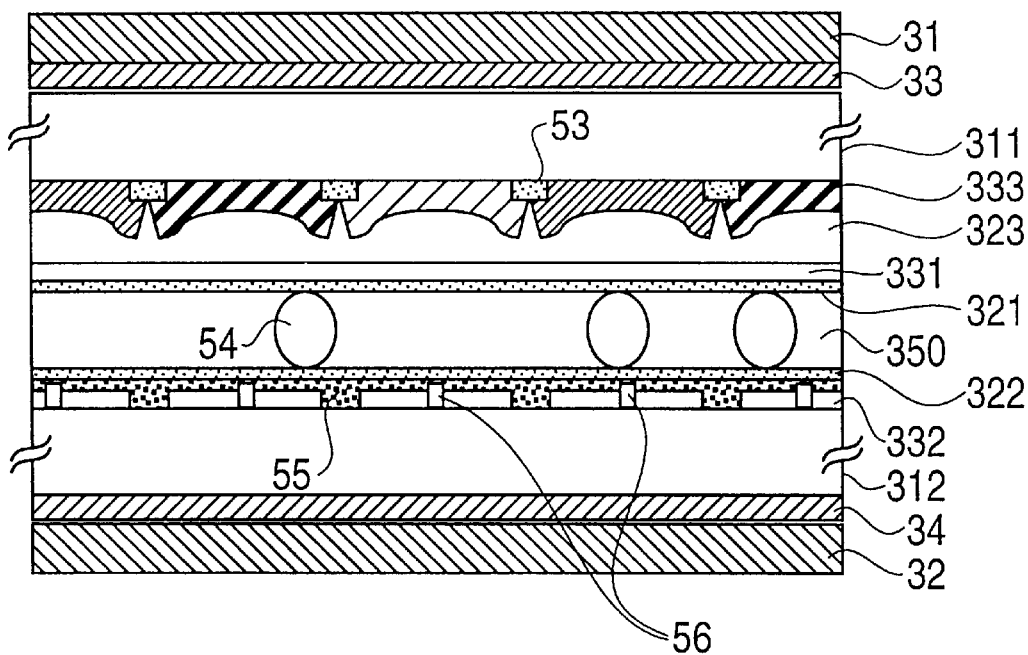
FIG. 16A is a cross section taken along the line A–A' of FIG. 15.
Figure 16B:
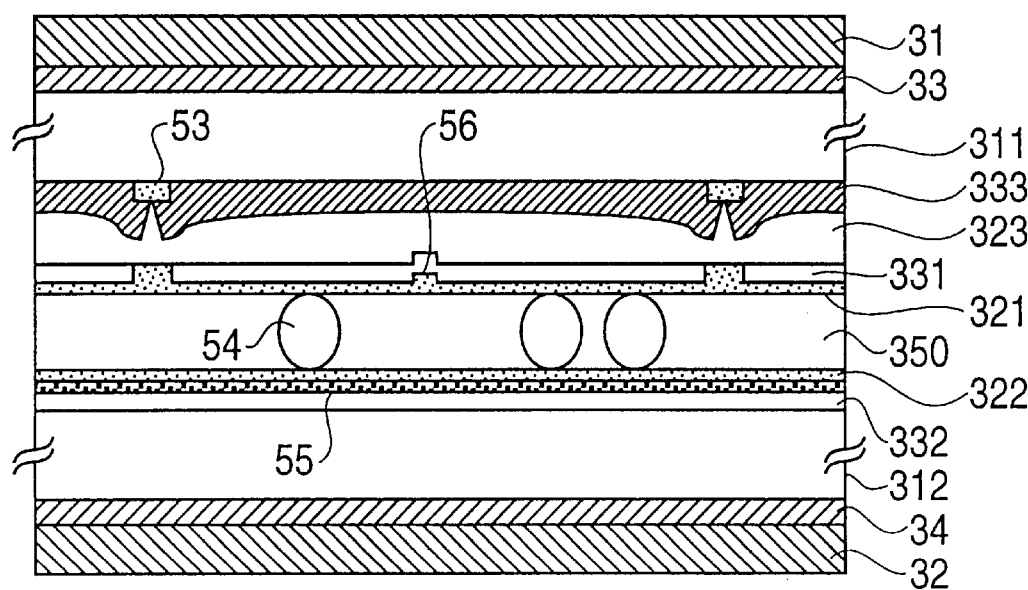
FIG. 16B is a cross section taken along the line B–B'.

FIG. 15 and FIGS. 16A and 16B are a schematic plan view showing an essential portion of the liquid crystal device to which the embodiment of FIG. 14A is applied, and schematic cross sections of FIG. 15, respectively.

Reference number 31 denotes an upper polarizing plate, 33 a retardation film, 311 an upper electrode substrate, 53 a black matrix, 57 a color filter, 323 a planarizing film, 331 upper electrodes (scanning electrodes), 321 an upper molecular alignment layer, 350 a liquid crystal layer, 54 a spacer bead, 322 a lower molecular alignment layer, 55 an electrode protective film, 332 lower electrodes (signal electrodes), 312 a lower electrode substrate, 34 a lower retardation film, and 32 a lower polarizing plate. Numeral 56 denotes a metal auxiliary electrode formed between the upper electrode substrate 311 and the upper electrodes 331; and 56' a metal auxiliary electrode formed between the lower electrode substrate 312 and the lower electrodes 332. The structures of the metal auxiliary electrodes 56, 56' are similar to that shown in FIG. 14A.

Figure 17:
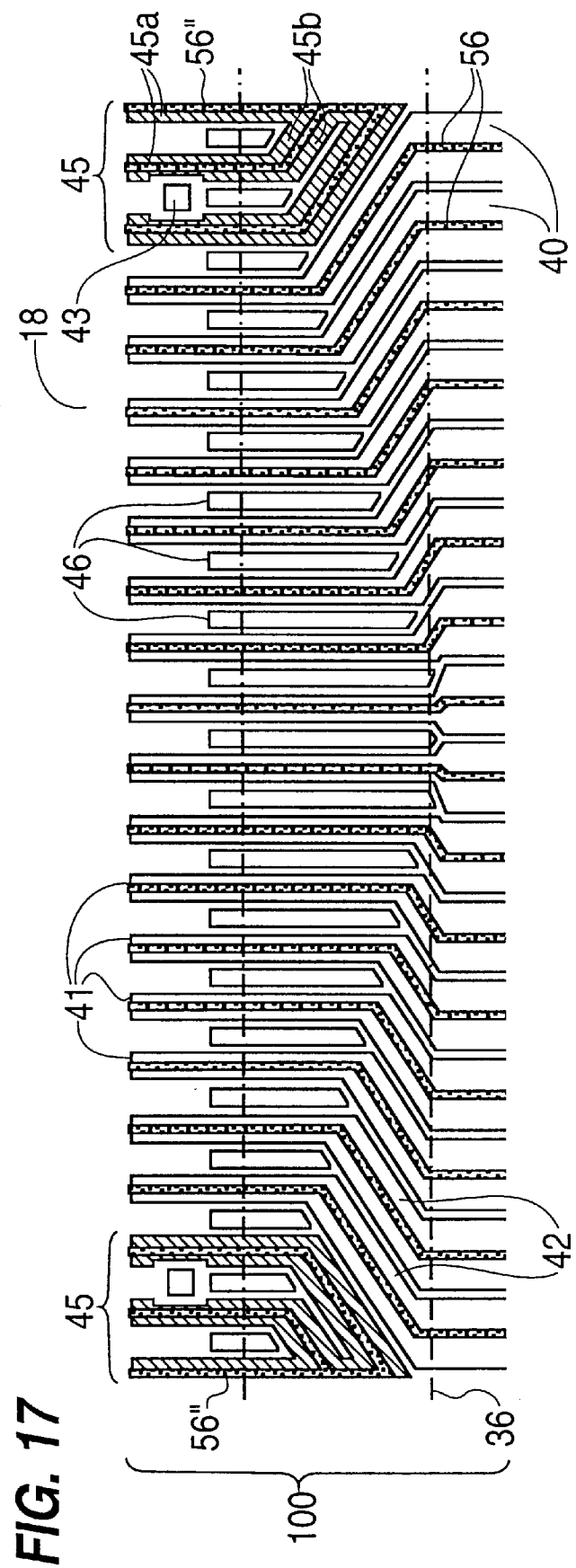
FIG. 17 is a partial plan view showing the fourth embodiment with a BMI structure.

FIG. 17 is a partial schematic plan view of the electrode substrate 311 showing the terminal section of the transparent electrodes 331 in the liquid crystal device to which the above embodiment is applied.

Reference numeral 41 represents terminals (connection electrodes, i.e., input terminals) connected to the TCP electrodes (outer leads on the output side); 42 inclined linear wirings that form part of the leadout wirings connecting the display transparent electrodes 40 and the terminals 41; 45, 46 dummy electrodes; 100 a terminal section including the terminals 41, leadout wirings, ends of the transparent electrodes 40 and dummy electrodes 45, 46; 43 TCP aligning marks used when mounting the TCP on the electrode substrate 311; and 36 a portion where the sealant is provided.

The pitches of the parallel transparent electrodes 40 wired over the electrode substrate 311 are larger than those of the transparent electrode terminals 41 led out to the end portion of the electrode substrate 311 and connected to the TCP. Hence, to connect these it is necessary to provide leadout wirings including the inclined linear wirings 42.

As shown in FIG. 17, this embodiment has the dummy electrodes 45 provided between the terminal groups, each consisting of terminals connected with TCPs arranged in line at the end portion of the electrode substrate. The dummy electrodes 45 are shaped as shown to occupy the space, that is, they consist of parallel electrodes 45a with equal pitches and equal widths and inclined linear electrodes 45b. The inclined electrodes 45b are provided between the inclined linear wirings 42 of the outermost terminals 41-n of the adjacent terminal groups at the same angle and with the same pitch as those of the inclined linear wirings 42. In this embodiment, the dummy electrodes 45 are formed of ITO film and electrically floating. As shown in FIG. 17, the metal auxiliary electrodes 56 for reducing wiring resistance are provided between the transparent electrodes 331 and the electrode substrate 311; and also between the dummy electrodes 45 and the electrode substrate 311 are provided metal auxiliary electrodes 56" of the same construction as those of the metal auxiliary electrodes 56.

A conventional liquid crystal display, in which there are spaces between the terminal groups 41 connected to the TCPs, has a drawback that the thick terminals 41 made of ITO film as thick as 0.2–0.3 μm causes differences in height between areas where terminals 41 are provided and where they are not, and during the mass production of the liquid crystal device the pattern of the height difference is transferred to the rubbing roller that performs the alignment treatment (rubbing) on the molecular alignment layer formed on the display electrodes 40. Performing the alignment treatment using this rubbing roller results in that rubbing streaks are formed on the molecular alignment layer, degrading the quality of display. In this embodiment, however, because the spaces between the TCPs are occupied by the dummy electrodes 45, the spaces are given the same surface roughness, or rubbing conditions, as those on both sides and rubbing streaks are not formed on the molecular alignment layer, improving the display quality.

The provision of the dummy electrodes 45 in the spaces between the TCPs can eliminate the recessed portions about 0.2 μm deep between the TCPs, making the gap between the upper and lower substrates uniform. Hence, it is possible to realize a uniform black unlighted area without tonal irregularity in the so-called frame edge portion, which lies inside the sealant 36 of the completed liquid crystal device (on the side where liquid crystal is interposed) and outside the display section (lighted area) where the electrodes on the upper and lower electrode substrates cross. It is also possible to control the gap between the substrates with high precision, thus preventing color variation and improving the display quality.

Further, as shown in FIG. 17, this embodiment has the dummy electrodes 46 provided in the spaces between the terminals 41 at the frame edge portion. The dummy electrodes 46 are spaced at equal pitches, and the distances between the dummy electrodes 46 and the terminals 41 on both sides (distances on both sides) are equal to each other and, in this embodiment, equal to the distances between the adjacent, inclined linear wirings 42. The dummy electrodes 46 in this embodiment are formed of ITO film and electrically floating. Although this embodiment is not provided with metal auxiliary electrodes with the construction similar to that of the metal auxiliary electrodes 56 between the dummy electrodes 46 and the electrode substrate, it is possible to provide the embodiment with them.

Because this embodiment has the dummy electrodes 46 in the spaces between the terminals 41 in the area including the frame edge portion, light can be prevented from leaking from between the terminals 41 in the frame edge portion. Further, in this embodiment, the in-plane densities of the terminals 41 and of the extended portions of the terminals are uniform, so that the gap between the upper and lower substrates are uniform over the entire area.

In the conventional liquid crystal display, because the inclined linear wirings of the leadout wirings are radially arranged, the intervals between the inclined linear wirings decrease from the display transparent electrodes toward the terminals, with the result that tonal variation is caused in the frame edge portion which should be uniformly black. This embodiment, however, is provided with the dummy electrodes 45, 46 which make the gap in the frame edge portion uniform, eliminating the above problem. In other words, the frame edge portion can be made uniformly black, contributing to the improvement of the display quality.

Further, the conventional liquid crystal device supports the spacers by the display transparent electrodes and inclined linear wirings, both formed of ITO film as thick as 0.2–0.3 $\mu$m on the upper and lower electrode substrates, the spacers in areas where there are no electrodes are free, making the gap control ineffective. Further, because the conventional, radially arranged, inclined linear wirings are not uniform in the wiring density, gap variation is caused in the frame edge portion, which in turn causes color variation. Particularly in STN-LCDs that require a high-precision gap ($\pm 0.1$ $\mu$m) between the electrode substrates, the gap precision is greatly affected by the effective wiring density in areas where there are spacers that are used to define the high-precision gap.

In this embodiment, the provision of the dummy electrodes 45, 46 makes the gap in the frame edge portion uniform, which in turn solves the above-mentioned problem, eliminating the color variation due to gap variation in the frame edge portion and improving the display quality.

While in this embodiment the dummy electrodes 46 are electrically floated, they may be connected at a point through a connecting portion of the minimum pattern so that the wiring resistances of the leadout wirings are equal to those of other leadout wirings.

FIG. 18 is an exploded perspective view showing the liquid crystal display module 1 produced by assembling into a compact body a liquid crystal device 18, a drive circuit for driving this liquid crystal device 18, and a light source.

The TCPs 14, 17 carrying the semiconductor IC chip for driving the liquid crystal device 18 are mounted on a printed circuit board 15, which has a window at the center for accommodating the liquid crystal device 18 and on which a circuit for driving liquid crystal is formed. The printed circuit board 15 to which the liquid crystal device 18 is fitted is installed in a window section of the plastic molded frame body 16, which is stacked on a lower metal frame 11. By bending claws into notches made in an upper metal frame 10, the lower metal frame 11 is secured to the upper metal frame 10.

A light guide 24 of acrylic plate for uniformly illuminating the liquid crystal device 18 with light from cold-cathode fluorescent lamps 20 arranged at the upper and lower ends of the liquid crystal device 18 is fitted into the window section of the frame body 16. An inverter power supply circuit (not shown) for operating the cold-cathode fluorescent lamps 20 is installed in a recess provided in the right-hand back of the frame body 16.

FIG. 20 is a perspective view of the liquid crystal device 18.

In FIG. 20, to align the liquid crystal molecules in the liquid crystal layer 350 held between the upper and lower electrode substrates 311, 312 so that the liquid crystal molecules are twisted into a helical structure, it is a general practice to use the so-called rubbing method of rubbing in one direction with cloth the molecular alignment layers 321, 322 made of organic high polymer resin, such as polyimide, which are in contact with liquid crystal and placed on the transparent upper and lower electrode substrates 311, 312 made of, for example, glass. The directions in which the molecular alignment layers are rubbed, i.e., the rubbing direction 6 of the upper electrode substrate 311 and the rubbing direction 7 of the lower electrode substrate 312 are the directions in which the liquid crystal molecules are aligned. The upper and lower electrode substrates 311, 312 that have undergone the above alignment treatment are made to oppose each other with a gap d1 therebetween so that their rubbing directions 6, 7 cross at an angle ranging from 180 degrees to 360 degrees. These two electrode substrates 311, 312 are then joined together with the sealant 36 which has a liquid crystal filling opening 351, a notch for sealing in liquid crystal. And nematic liquid crystal, which has a positive dielectric anisotropy and which contains a specified amount of rotary-polarizing substance, is sealed in. The liquid crystal molecules between the electrode substrates are aligned into a helical structure with a twist angle $\theta$ shown in the figure.

Numerals 331, 332 denote transparent upper and lower electrodes made of indium oxide or ITO (the lower electrodes 331 correspond to 40-1 to 40-8 of FIG. 1). Arranged on the upper electrode substrate 311 of the liquid crystal device and under the lower electrode substrate 312 of the same are members 33, 34 that produce birefringent effects (referred to as birefringent members; Fujimura, et al., "Retardation Film for STN-LCD," Zasshi Denshi Zairyo, February issue, 1991, pp. 37–41). Upper and lower polarizing plates 31, 32 are mounted on these members 33, 34 to hold these members and the liquid crystal device 18 between them.

The twist angle $\theta$ of the liquid crystal molecules in the liquid crystal layer 350 can lie in a range of 180 to 360 degrees and preferably 200 to 300 degrees. From the practical standpoint of avoiding alignment in which light is dispersed in the ON state near the threshold value of a transmission factor-applied voltage curve and of maintaining an excellent time-division characteristic, it is more preferable that the twist angle range is 230–270 degrees. Under the condition, basically, the response of the liquid crystal molecules to the applied voltage is more sensitive and an excellent time-division characteristic is realized.

Further, to achieve an improved display quality, it is preferable that the product $\Delta n1 \cdot d1$ of the refraction index anisotropy $\Delta n1$ of the liquid crystal layer 350 and its thickness d1 is in the range of 0.5–1.0 $\mu$m, and more preferably 0.6–0.9 $\mu$m.

The birefringent members 33, 34 function to modulate the polarized state of light passing through the liquid crystal device 18 and to convert into a black/white display the monochromatic display. Only the monochromatic display has been achieved by only the liquid crystal device 18.

For this reason, the products $\Delta n2 \cdot d2$, $\Delta n3 \cdot d3$ of the refraction index anisotropies $\Delta n2$, $\Delta n3$ of the birefringent members 33, 34 and their thicknesses d2, d3, are very important. Their sum $\Delta n2 \cdot d2 + \Delta n3 \cdot d3$ is preferably in the range of 0.4–1.0 $\mu$m, and more preferably 0.6–0.9 $\mu$m and it is important to make its difference from $\Delta n1 \cdot d1$ of liquid crystal be less than 0.1 $\mu$m.

Furthermore, because the liquid crystal device 18 utilizes elliptical polarization due to birefringence, the relationship is very important among the polarization axes or absorption axes of the polarizing plates 31, 32, the optical axes of uniaxial transparent birefringence plates when they are used as the birefringent members 33, 34, and the liquid crystal alignment directions 6, 7 of the electrode substrates 311, 312 of the liquid crystal device 18.

Figure 19:
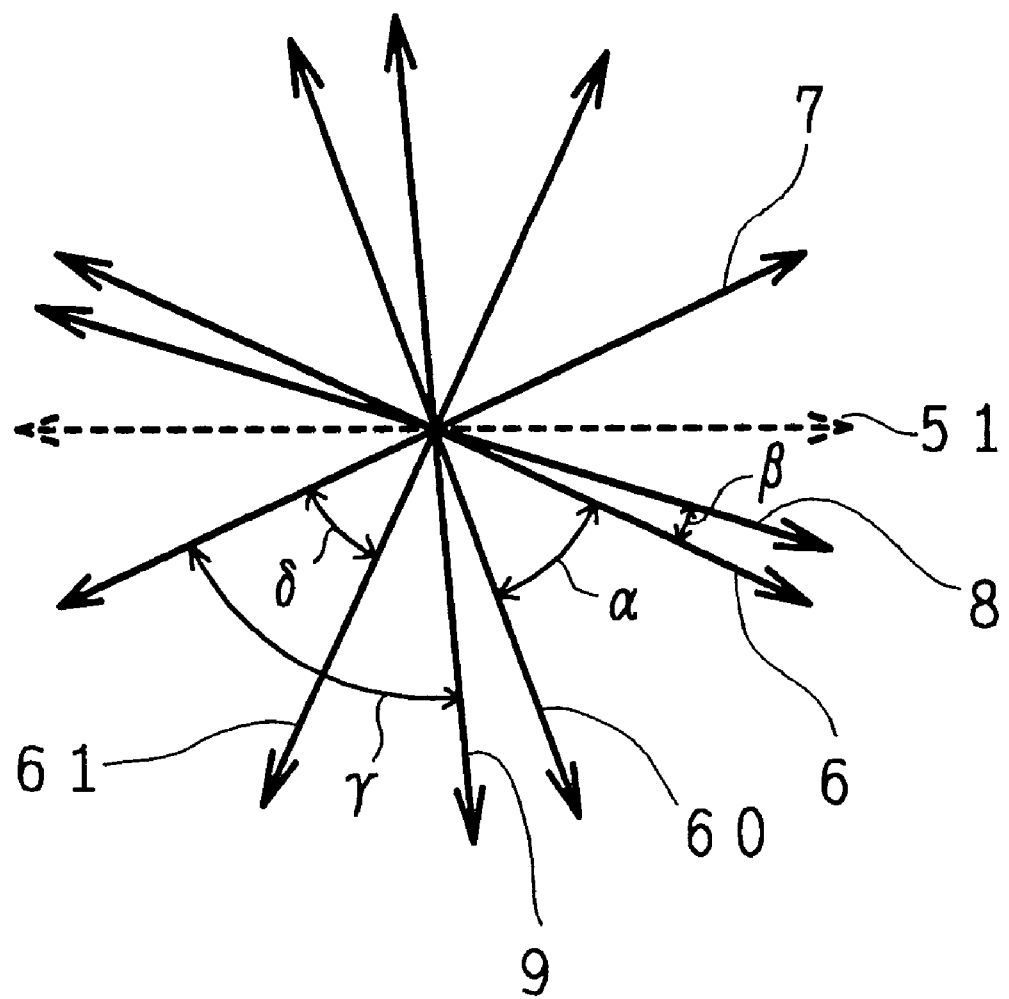
FIG. 19 is a first explanatory diagram showing the relationship between the orientation direction of liquid crystal molecules, the twist direction of liquid crystal molecules, the direction of the polarizing or absorption axis of the polarizing plate, and the direction of the optical axis of the retardation film in the liquid crystal display to which this invention is applied.

FIG. 19 shows the relation between the axes of the polarizing plates, the optical axes of the uniaxial, transparent birefringent members, and the liquid crystal alignment directions of the electrode substrates of the liquid crystal device.

In FIG. 19, numeral 60 denotes the optical axis of the uniaxial, transparent birefringent member 33; 6 the liquid crystal alignment directions of the birefringent member 33 and the upper electrode substrate 311 adjoining it; 61 the optical axis of the uniaxial, transparent birefringent member 34; 7 the liquid crystal alignment direction of the lower electrode substrate 312; 8 the absorption axis or polarization axis of the upper polarizing plate 31; and 9 the absorption axis or polarization axis of the lower polarizing plate 32.

The angle α is an angle formed by the liquid crystal alignment direction 6 of the upper electrode substrate 311 and the optical axis 60 of the uniaxial, transparent complex refractive member 33. The angle β is an angle formed by the absorption axis or polarization axis 8 of the upper polarizing plate 31 and the liquid crystal alignment direction 6 of the upper electrode substrate 311. The angle γ is an angle formed by the absorption axis or polarization axis 9 of the lower polarizing plate 32 and the liquid crystal alignment direction 7 of the lower electrode substrate 312. The angle δ is an angle formed by the liquid crystal alignment direction 7 of the lower electrode substrate 312 and the optical axis 61 of the uniaxial, transparent complex bifringent member 34.

Here, the method of measuring these angles α, β, γ, δ will be defined.

Figure 24A:
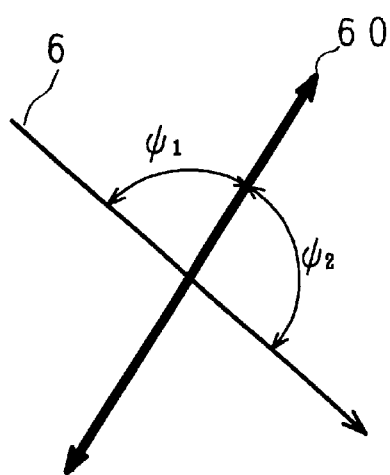
FIGS. 24A and 24B are schematic diagrams showing how the cross angles $\alpha$, $\beta$, $\gamma$ and $\delta$ in the liquid crystal display of this invention are measured.
Figure 24B:
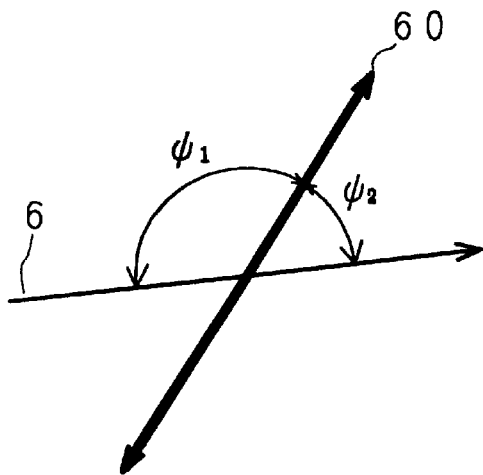

Referring to FIGS. 24A and 24B, the angle of intersection between the optical axis 60 of the birefringent member 33 and the liquid crystal alignment direction 6 of the upper electrode substrate 311 is taken as an example.

The angle of intersection between the optical axis 60 and the liquid crystal alignment direction 6 can be expressed by ψ1 and ψ2, as shown in FIGS. 24A and 24B. Whichever angle is smaller, ψ1 or ψ2, will be used here.

That is, in FIG. 24A, because ψ1<ψ2, ψ1 is taken as the angle of intersection between the optical axis 60 and the liquid crystal alignment direction 6. In FIG. 24B, because ψ1>ψ2, ψ2 is taken as the angle of intersection between the optical axis 60 and the liquid crystal alignment direction 6. When ψ1=ψ2, either can be used.

In this kind of liquid crystal display, the angles α, β, γ, δ are very important. The angle α is preferably in the range of 20–60 degrees, and more preferably 30–50 degrees, the angle β is preferably in the range of 0–40 degrees, and more preferably 10–30 degrees, the angle γ is preferably in the range of 0–40 degrees, and more preferably around 10–30 degrees, and the angle δ is preferably in the range of 60–90 degrees, and more preferably around 80 degrees.

As long as the twist angle θ of the liquid crystal layer 350 of the liquid crystal device is within the range between 180 degrees and 360 degrees, the angles α, β, γ only need to be in the above ranges whether the twist direction 310 is clockwise or counterclockwise.

Figure 21:
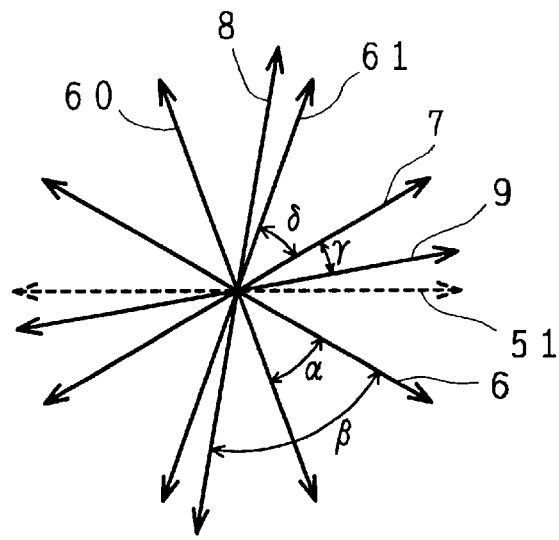
FIG. 21 is a second explanatory diagram showing the relationship between the orientation direction of liquid crystal molecules, the twist direction of liquid crystal molecules, the direction of the polarizing or absorption axis of the polarizing plate, and the direction of the optical axis of the retardation film in the liquid crystal display to which this invention is applied.

Next, referring to FIG. 21, other details are described. The basic configuration is similar to those shown in FIGS. 19 and 20.

In FIG. 21, the twist angle θ of the liquid crystal molecules is 240 degrees and a uniaxially drawn high polymer resin film was used for the uniaxial, transparent birefringent members 33, 34.

The ratio d/p of the helical pitch p (μm) of the liquid crystal material containing a rotary-polarizing substance to the thickness d1 (μm) of the liquid crystal layer was about 0.54. The molecular alignment layers 321, 322 used were formed of polyimide resin film and subjected to rubbing. The pretilt angle, at which the molecular alignment layers that have undergone the rubbing caused the liquid crystal molecules in contact with the molecular alignment layers to tilt with respect to the substrate surface, is about 4–6 degrees. The sum Δn2·d2+Δn3·d3 of retardations of the uniaxial, transparent birefringent materials 33, 34, was about 0.870 μm. On the other hand, Δn1·d1 of the liquid crystal layer 350 whose liquid crystal molecules are twisted 240 degrees is about 0.865 μm.

Figure 22:
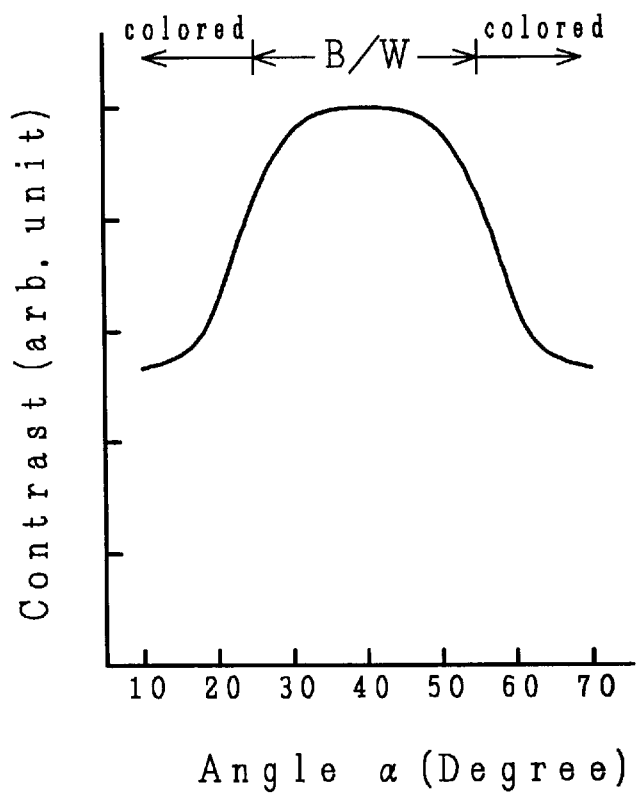
FIG. 22 is a graph showing the contrast, transmitted light color, and cross angle a characteristic in the liquid crystal display to which this invention is applied.

FIG. 22 is a graph showing how the contrast changes as the angle α in the structure of FIG. 19 is varied when the liquid crystal display is the time-division driven at a 1/240 duty ratio. The contrast is very high when the angle α is close to 40 degrees and lowers as the angle deviates from this value. As the angle α becomes smaller, both the lit area and unlit area becomes bluish. When the angle α becomes large, the unlit area turns purple and the lit area turns yellow, making the black/white display impossible. The almost similar results are obtained also with the angle β and γ. In the case of the angle δ, when it rotates about ±20 degrees from 80 degrees, the black/white display is inverted, as described earlier.

Figure 23:
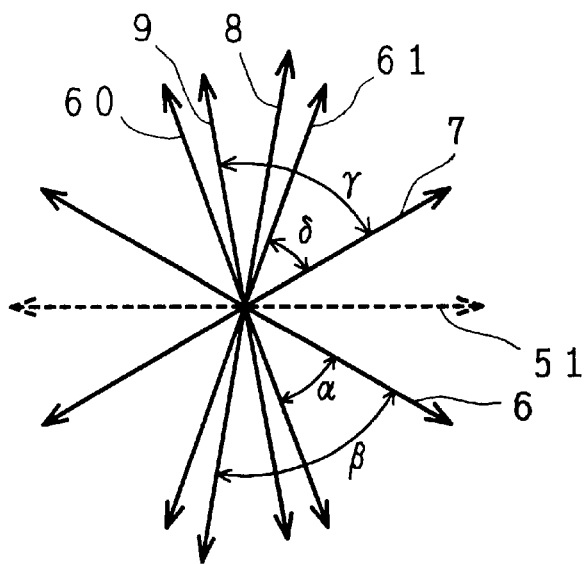
FIG. 23 is a third explanatory diagram showing the relationship between the orientation direction of liquid crystal molecules, the twist direction of liquid crystal molecules, the direction of the polarizing or absorption axis of the polarizing plate, and the direction of the optical axis of the retardation film in the liquid crystal display to which this invention is applied.

Next, referring to FIG. 23, other details are explained. The basic configuration is similar to the above case, except that the twist angle of the liquid crystal molecules in the liquid crystal layer 350 is 260 degrees, Δn1·d1 is about 0.7–0.8 μm, and the device is normally open. The sum of retardations of the uniaxially drawn resin films used as the uniaxial, transparent birefringent materials 33, 34 is about 0.7 μm, smaller than that of FIG. 19. It is important that the retardation of liquid crystal and the retardation of retardation film (sum of 33 and 34) be less than 1 μm.

In this configuration, by determining the angle α to be about 40 degrees, the angle β to be about 70 degrees, the angle γ to be about 50 degrees and the angle δ to be about 80 degrees, the black/white display similar to the above was able to be realized although it was inverted.

Figure 25:
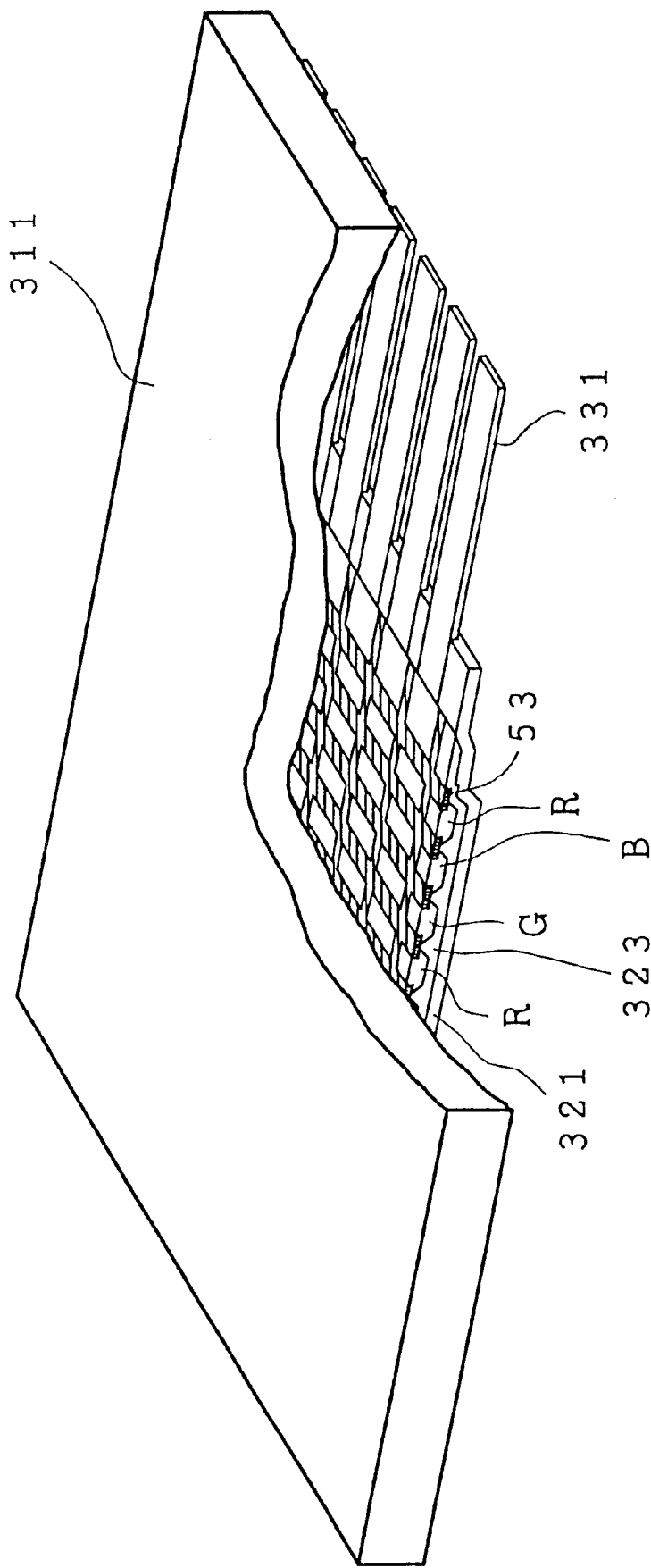
FIG. 25 is a partly cutaway, perspective view showing the construction of the scanning electrode substrate section in the liquid crystal display of this invention.

Next, the construction of the scanning electrode substrate 311 will be described referring to the perspective view of FIG. 25.

The basic structure is similar to that shown in FIG. 9A. As shown in FIG. 25, by providing red, green and blue color filters R, G, B on the upper electrode substrate 311 and a light shielding film 53 between the filters, a multi-color display is obtained.

Though not shown, the signal electrodes 332 are divided into upper signal electrodes and lower signal electrodes to divide the lower electrode substrate 312 into upper and lower screens and drive them separately.

Figure 26:
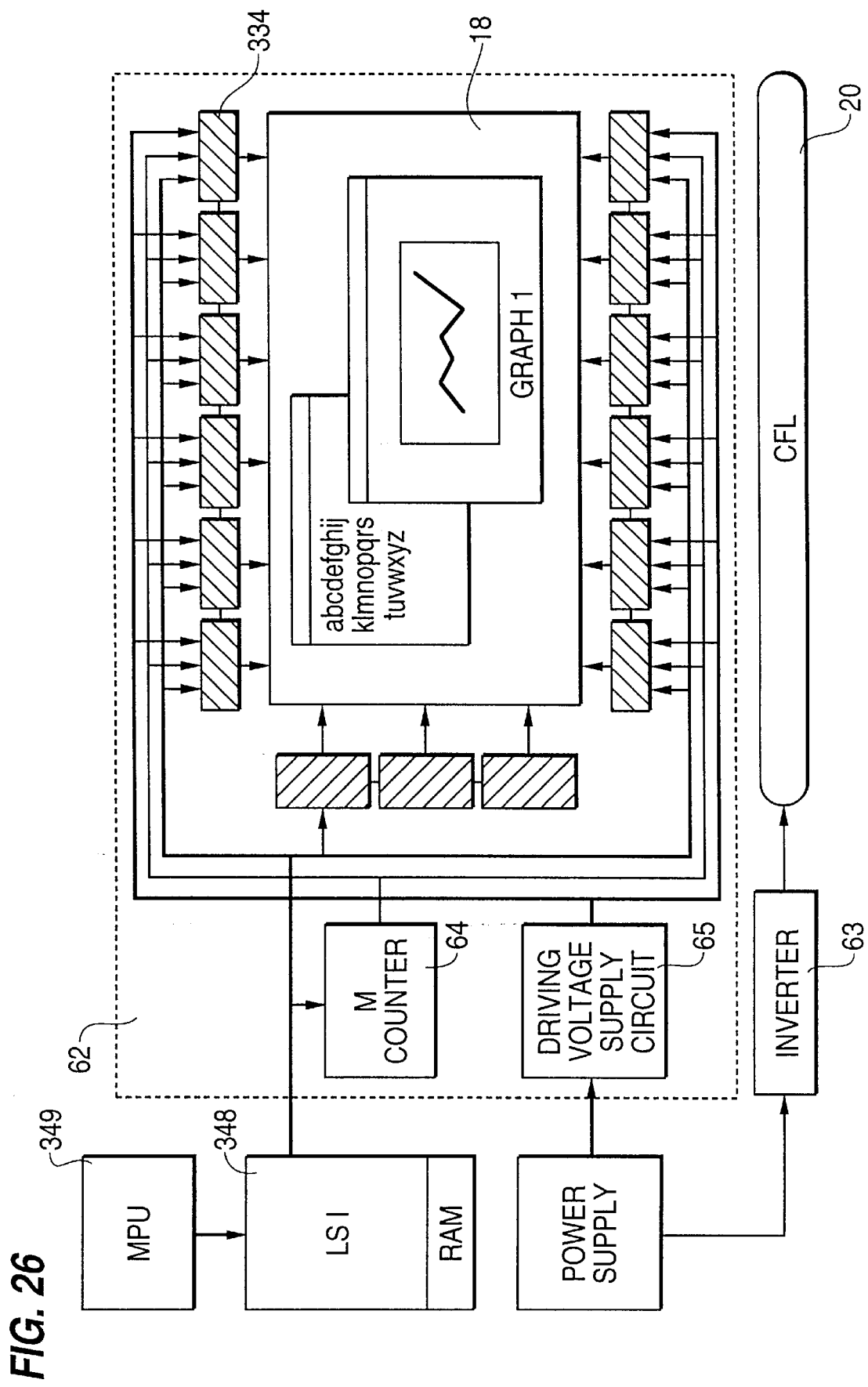
FIG. 26 is a functional block diagram of a laptop personal computer using the liquid crystal display of this invention for its display section.

FIG. 26 is a block diagram of the liquid crystal display 1 of this invention when it is used in the display section of a notebook or laptop personal computer.

In the figure, the result of calculation performed by a microprocessor 349 is fed through a control LSI 348 to the drive ICs 334, which drive the liquid crystal device 18.

Figure 27:
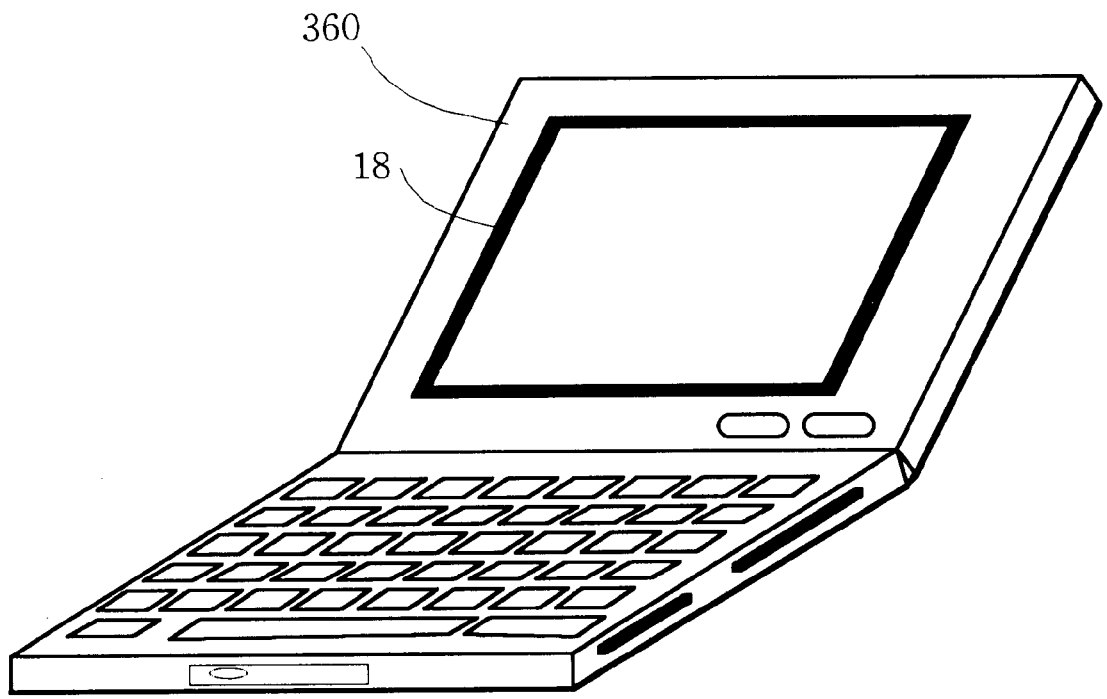
FIG. 27 is a view showing the appearance of the laptop personal computer using the liquid crystal display of this invention for its display section.

FIG. 27 shows the liquid crystal device 18 mounted in a laptop personal computer 360.

As described above, this invention can provide a liquid crystal display which has short and low-resistance leadout wirings whose area utilization factor is high. The liquid crystal display of this invention is also characterized in that the display section is free from uneven rubbing streaks, the frame edge portion is free from tonal variation and has a uniformly black unlit area, the gap between the upper and lower electrode substrates can be controlled precisely, and the liquid crystal display is free from color variation.

Because the area utilization factor (wiring efficiency) of the leadout wirings can be improved by forming the wirings as mentioned above, the lengths of the leadout wirings can be shortened, thus reducing the wiring resistance about 30–40% from conventional values of 500–1000Ω. The wiring resistance reduction can be contribute to the margin of the ON resistances of the drive semiconductor ICs and this in turn allows the dimension of the semiconductor IC chips to be reduced. Further, because the readout wirings can be shorter than conventional ones, it is possible to reduce the dimensions of the liquid crystal device. As a result, the manufacturing cost is reduced. Furthermore, reduction in the wiring resistance can reduce distortion of liquid crystal drive waveforms and crosstalk, which in turn reduces shadowing (uneven brightness), thereby improving the display quality.

Further, the first dummy electrodes are provided in a wide space between the terminal groups connected to TCPs arranged in line at the end portion of the electrode substrate. This arrangement prevents uneven pattern due to height difference between the areas where terminals exist and where they do not from being transferred to the rubbing roller, which performs alignment treatment (rubbing) of the molecular alignment layers formed over the display electrodes. This in turn prevents rubbing streaks from being formed on the molecular alignment layers and therefore the display quality from deteriorating. Furthermore, because the first dummy electrodes eliminate recesses between the TCPs, the gap between the upper and lower substrates can be made uniform.

The second dummy electrodes are provided in spaces between the terminals and this prevents light from leaking from between the terminals in the frame edge portion. Further, because the in-plane wiring densities of the area where the terminals are provided and the area where the extended terminals are provided are equal to each other, the gap between the upper and lower substrates is uniform. It is also possible to eliminate tonal variation due to uneven wiring density of the conventional, radially arranged inclined linear wirings at the frame edge portion, making the frame edge portion uniformly black, the frame edge portion being intended to be uniformly black. As a result, the display quality is enhanced.

Moreover, because the first and second dummy electrodes make the gap at the frame edge portion uniform, such problems as color variation caused by gap variation in the frame edge portion is eliminated, improving the display quality.

We claim:

1. A liquid crystal display suitable for high-quality display comprising:
    a pair of liquid crystal device substrates so arranged as to be opposite to each other and joined together by a sealant with a liquid crystal interposed therebetween; and
    a plurality of liquid crystal drive elements connected to wirings on the liquid crystal device substrate and provided to drive the liquid crystal;
wherein the liquid crystal device substrates are provided with:
    a plurality of parallel display electrodes;
    a plurality of parallel terminal electrodes led out to the end portion of the liquid crystal device substrates, connected to the liquid crystal drive elements, and arranged at pitches smaller than those of the display electrodes parallelly to the display electrodes; and
    a plurality of wirings including almost mutually parallel, inclined linear wiring electrodes for connecting the display electrodes and the terminal electrodes; and
wherein the lengths of the terminal electrodes and the widths of the inclined linear wiring electrodes are adjusted so that each resistances of each set of the terminal electrodes and each set of the inclined linear wiring electrodes are substantially equal.

2. A liquid crystal display according to claim 1, wherein the liquid crystal device substrates further include a plurality of first dummy electrodes disposed parallelly to the terminal electrodes between the terminal electrodes in at least a central portion of liquid crystal drive circuits.

3. A liquid crystal display according to claim 2, wherein the liquid crystal device substrates further include a partial short-circuiting portion for electrically connecting the first dummy electrodes to the terminal electrodes.

4. A liquid crystal display according to one of claims 1 to 3, wherein the intervals between two terminal electrode groups connected to at least the two liquid crystal drive circuits are greater than the intervals between the individual terminal electrodes in the terminal electrode groups, and the wirings provided on the liquid crystal device substrates further include second dummy electrodes arranged between the terminal electrode groups.

5. A liquid crystal display according to one of claims 2 and 3, wherein, in the area outside the display area of a first liquid crystal device substrate with scanning electrodes, out of the liquid crystal device substrates, third dummy wirings having the same shapes as that of a second liquid crystal device substrate with signal electrodes are provided, and in the area outside the display area of the second liquid crystal device substrate fourth dummy wirings having the same shapes as that of the first liquid crystal device substrates.

6. A liquid crystal display according to claim 1, wherein metal auxiliary electrodes, whose widths are narrower than at least those of the wirings on the liquid crystal device substrates, are provided on the surfaces of the liquid crystal device substrates opposite to a liquid crystal layer.

7. A liquid crystal display according to claim 6, wherein the metal auxiliary electrodes have a multilayer structure in which an aluminum film is held between chromium films.

8. A liquid crystal display according to one of claims 6 to 7, wherein the wirings including the metal auxiliary electrodes are provided on only the first liquid crystal device substrate having the scanning electrodes.

9. A liquid crystal display according to claim 4, wherein the second dummy electrodes are spaced at specified intervals so that they do not overlap with an aligning mark for precise connection between terminals of the liquid crystal drive elements and the terminal electrodes on the liquid crystal device substrates.

10. A liquid crystal display suitable for high-quality display comprising:
    a pair of liquid crystal device substrates so arranged as to be opposite to each other and joined together by a sealant with a liquid crystal interposed therebetween; and
    a plurality of liquid crystal drive elements connected to wirings on the liquid crystal device substrates and provided to drive the liquid crystal;
wherein the liquid crystal device substrates are provided with:

a plurality of parallel display electrodes;

a plurality of parallel terminal electrodes led out to the end portion of the liquid crystal device substrates, connected to the liquid crystal drive elements, and arranged at the terminal electrodes pitches smaller than those of the display electrodes parallelly to the display electrodes;

a plurality of wirings including almost mutually parallel, inclined linear wiring electrodes for connecting the display electrodes and the terminal electrodes; and a color filter formed on one of the liquid crystal device substrates; and wherein the lengths of the terminal electrodes and the widths of the inclined linear wiring electrodes are so adjusted so that each resistances of each set of the terminal electrodes and each set of the inclined linear wiring electrodes are substantially equal to each other.

11. A liquid crystal display according to claim 10, wherein the liquid crystal device substrates further include a plurality of first dummy electrodes disposed parallelly to the terminal electrodes between the terminal electrodes in at least a central portion of liquid crystal drive circuits.

12. A liquid crystal display according to claim 11, wherein the liquid crystal device substrates further include a partial short-circuiting portion for electrically connecting the first dummy electrodes to the terminal electrodes.

13. A liquid crystal display according to one of claims 10 to 12, wherein the intervals between two terminal electrode groups connected to at least the two liquid crystal drive circuits are greater than the intervals between the individual terminal electrodes in the terminal electrode groups, and the wirings provided on the liquid crystal device substrates further include second dummy electrodes arranged between the terminal electrode groups.

14. A liquid crystal display according to one of claims 11 and 12, wherein, in the area outside the display area of a first liquid crystal device substrate with scanning electrodes, out of the liquid crystal device substrates, third dummy wirings having the same shapes as that of a second liquid crystal device substrate with signal electrodes are provided, and in the area outside the display area of the second liquid crystal device substrate fourth dummy wirings having the same shapes as that of the first liquid crystal device substrates.

15. A liquid crystal display according to claim 10, wherein metal auxiliary electrodes, whose widths are narrower than at least those of the wirings on the liquid crystal device substrates, are provided on the surfaces of the liquid crystal device substrates opposite to a liquid crystal layer.

16. A liquid crystal display according to claim 15, wherein the metal auxiliary electrodes have a multilayer structure in which an aluminum film is held between chromium films.

17. A liquid crystal display according to one of claims 15 to 16, wherein the wirings including the metal auxiliary electrodes are provided on only the first liquid crystal device substrate having the scanning electrodes.

18. A liquid crystal display according to claim 13, wherein the second dummy electrodes are spaced at specified intervals so that they do not overlap with an aligning mark for precise connection between terminals of the liquid crystal drive elements and the terminal electrodes on the liquid crystal device substrates.

19. A liquid crystal display having plural tape carrier packages comprising:

a pair of substrates so arranged as to be opposite to each other;

a liquid crystal layer interposed between said pair of substrates and a sealant to join said pair of substrates together; and a plurality of tape carrier packages each having a drive circuit connected to terminal electrodes on the substrates; and wherein one of said substrates includes:

first and second display electrodes disposed inside said sealant in parallel with each other, each display electrode having a first width $W_{(LCD)}$;

first and second terminal electrodes disposed so as to extend from inside to outside of said sealant in parallel with each other, each terminal electrode having a second width ($W_{TCP}$) and arranged at pitches smaller than those of the display electrodes parallelly to the display electrodes; and first and second inclined electrodes for connecting each of the first and second display electrodes to each of the first and second terminal electrodes, the first inclined electrode having a third width ($W_{n-1}$) and the second inclined electrode having a fourth width ($W_n$), the first inclined electrode being adjacent to said second inclined electrode;

wherein a first set of the first terminal electrode, the first display electrode and the first inclined electrode has a relationship with a second set of the second terminal electrode, the second display electrode and the second inclined electrode in accordance with the following formula:

$$\frac{e_{(n-1)}}{W_{TCP}} + \frac{m_{n-1}}{W_{n-1}} + \frac{p_{n-1}}{W_{LCD}} = \frac{m_n}{W_n} + \frac{p_n}{W_{LCD}}$$

wherein

1) $m_{n-1}$ is a length between a first middle point and a third middle point, the first middle point being between each crossing point of outlines of the first inclined electrode and the first terminal electrode at the terminal electrode side and the third middle point being between each crossing point of outlines of the first inclined electrode and the first display electrode at the display electrode side, 2) $m_n$ is a length between a second middle point and a fourth middle point, said second middle point being between each crossing point of outlines of the second inclined electrode and the second terminal electrode at the terminal electrode side and the fourth middle point being between each crossing point of outlines of the second inclined electrode and the second display electrode at the display electrode side, 3) $P_{n-1}$ is a length between the third middle point and a predetermined line which is parallel to an adjacent edge-line of the substrates in a perpendicular direction of the predetermined line, 4) $P_n$ is a length between the fourth middle point and the predetermined line in a perpendicular direction of the predetermined line, and 5) $e_{(n-1)}$ is a length between the first middle point and the second middle point in a parallel direction of the outlines of the first and second inclined electrode.

20. A liquid crystal display according to claim 19, wherein the substrates further include a plurality of first dummy electrodes disposed parallelly to the terminal electrodes between the terminal electrodes in at least a central portion of liquid crystal drive circuits.

21. A liquid crystal display according to claim 19, wherein the substrates further include a partial short-circuiting portion for electrically connecting the first dummy electrode to the terminal electrode.

22. A liquid crystal display according to claim 19, wherein the intervals between two terminal electrode groups connected to the at least two drive circuits are greater than the intervals between the individual terminal electrodes in the terminal electrode groups, and the substrates further include dummy electrodes arranged between the terminal electrode groups.

23. A liquid crystal display according to claim 19, wherein, in the area outside the display area of the first substrate with scanning electrodes, first dummy electrodes having the same shapes as that of the second substrate with signal electrodes are provided, and in the area outside the display area of the second substrate, second dummy electrodes having the same shapes as that of the first substrate are provided.

24. A liquid crystal display according to claim 19, wherein the predetermined line is an extended line of outline of the first display electrode in parallel with the adjacent edge of substrates when the first display electrode is disposed at the most center position of the display electrode group electrically connected to one of the drive circuits.

* * * * *